(12) United States Patent
Cook et al.

(10) Patent No.: US 6,986,943 B1
(45) Date of Patent: *Jan. 17, 2006

(54) SURFACE MODIFIED PARTICLES BY MULTI-STEP ADDITION AND PROCESS FOR THE PREPARATION THEREOF

(75) Inventors: Ronald Lee Cook, Lakewood, CO (US); Brian John Elliott, Superior, CO (US); Silvia DeVito Luebben, Golden, CO (US); Andrew William Myers, Arvada, CO (US); Bryan Matthew Smith, Boulder, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 220 days.

This patent is subject to a terminal disclaimer.

(21) Appl. No.: 10/171,402

(22) Filed: Jun. 12, 2002

(51) Int. Cl.
*B05D 1/36* (2006.01)
*B32B 1/00* (2006.01)

(52) U.S. Cl. .............. 428/402; 428/403; 428/404; 427/214; 427/215

(58) Field of Classification Search ........... 428/403, 428/404, 402; 427/214, 215
See application file for complete search history.

(56) References Cited

U.S. PATENT DOCUMENTS

| | | | | |
|---|---|---|---|---|
| 3,117,944 A | 1/1964 | Harrell | ............ | 260/41 |
| 3,268,295 A | 8/1966 | Armbrust, Jr et al. | ........ | 23/141 |
| 3,411,876 A | 11/1968 | Michel et al. | ........ | 23/143 |
| 3,411,877 A | 11/1968 | Michel et al. | ........ | 23/143 |
| 3,901,845 A | 8/1975 | Newbould | ........ | 260/37 N |
| 3,997,476 A | 12/1976 | Cull | ........ | 252/463 |
| 4,010,247 A | 3/1977 | Wassermann et al. | ...... | 423/626 |
| 4,091,164 A | 5/1978 | Schwarz | ........ | 428/404 |
| 4,169,014 A | 9/1979 | Goldberg | ........ | 435/182 |
| 4,211,667 A | 7/1980 | Yamada et al. | ........ | 252/313 R |
| 4,327,032 A | 4/1982 | Lohse et al. | ........ | 260/448 |
| 4,349,389 A | 9/1982 | Schofield | ........ | 106/308 |
| 4,420,341 A | 12/1983 | Ferrigno | ........ | 106/308 |
| 4,496,714 A | 1/1985 | Murata et al. | ........ | 528/272 |
| 4,532,072 A | 7/1985 | Segal | ........ | 252/313.1 |
| 4,676,928 A | 6/1987 | Leach et al. | ........ | 252/313.1 |
| 4,764,495 A | 8/1988 | Rice | ........ | 502/62 |
| 4,900,767 A | 2/1990 | Rice | ........ | 523/205 |
| 4,929,589 A * | 5/1990 | Martin et al. | ........ | 502/406 |
| 4,952,634 A | 8/1990 | Grossman | ........ | 525/190 |

(Continued)

FOREIGN PATENT DOCUMENTS

EP 0576695 A 1/1994

(Continued)

OTHER PUBLICATIONS

K. Andrianov et al., *Synthesis of New Polymers with Inorganic Chains of Molecules*, Journal of Polymer Science, vol. XXX, pp. 513-524, 1958.

(Continued)

*Primary Examiner*—Monique R. Jackson
(74) *Attorney, Agent, or Firm*—Greenlee, Winner and Sullivan, P.C.

(57) ABSTRACT

The present invention relates to a new class of surface modified particles and to a multi-step surface modification process for the preparation of the same. The multi-step surface functionalization process involves two or more reactions to produce particles that are compatible with various host systems and/or to provide the particles with particular chemical reactivities. The initial step comprises the attachment of a small organic compound to the surface of the inorganic particle. The subsequent steps attach additional compounds to the previously attached organic compounds through organic linking groups.

49 Claims, 3 Drawing Sheets

Two-step surface-modification process.

U.S. PATENT DOCUMENTS

| | | | | |
|---|---|---|---|---|
| 4,992,199 | A | 2/1991 | Meyer et al. | 252/180 |
| 5,212,261 | A | 5/1993 | Stierman | 525/506 |
| 5,418,298 | A | 5/1995 | Laine et al. | 525/389 |
| 5,593,654 | A | 1/1997 | Decker, Jr. et al. | 423/625 |
| 5,593,781 | A | 1/1997 | Nass et al. | 428/403 |
| 5,814,407 | A * | 9/1998 | Richard et al. | 428/404 |
| 6,207,130 | B1 | 3/2001 | Kareiva et al. | 423/600 |
| 6,224,846 | B1 | 5/2001 | Hurlburt et al. | 423/625 |
| 6,228,903 | B1 | 5/2001 | Beall et al. | 523/209 |
| 6,322,890 | B1 | 11/2001 | Barron et al. | 428/402 |
| 6,369,183 | B1 | 4/2002 | Cook et al. | 528/10 |
| 6,602,933 | B2 * | 8/2003 | Tang et al. | 523/212 |

FOREIGN PATENT DOCUMENTS

| | | | |
|---|---|---|---|
| GB | 2039913 | A | 8/1980 |
| WO | 9321197 | A | 10/1993 |
| WO | 9626240 | A | 8/1996 |
| WO | 97/23288 | | 7/1997 |
| WO | 9950203 | A | 10/1999 |
| WO | 00/09578 | | 2/2000 |

OTHER PUBLICATIONS

A. Apblett et al., *Systhesis and Characterization of Triethylsiloxy-Substituted Alumoxanes: Their Structural Relationship to the Minerals Boehmite and Diaspore*, Chemistry of materials 4(1):167-182, 1992.

A. Apblett et al., *From Minerals to Materials: A Facile Synthetic Route to Preceramic Polymers for Aluminum Oxide*, Materials Research Society Symposium Proceedings, vol. 249, pp 75-80, 1992.

R.S. Bauer, *Epoxy Resins*, ACS Symp. Ser. 285, *Applied Polymers Science*, II Edition, Roy W. Tess and G. W. Poehlein, Editors, ACS, Washington, pp. 931-961, 1985.

R. Callender et al., *Aqueous Synthesis of Water-Soluble Alumoxanes: Environmentally Benign Precursors to Alumina and Aluminum-Based Ceramics*, Chemistry of Materials 9(11):2418-2433, 1997.

J.M.G. Cowie, *Polymers: Chemistry and Physics of Modern Material*, Intertext Books, Aylesbury, pp. 1-23, 1973.

J.H.W. deWitt et al., *Evaluation of Coatings—A Total System Approach*, Materials Science Forum, vol. 247, pp 69-82, 1997.

B. Ellis, *Chemistry and Technology of Epoxy Resins*, Blackie Academic & Professional, Chapters 1,2,4 & 7, pp 1-71, 117-143, 206-255, 1993.

A. Gusev et al., *Rational Design of Nanocomposites for Barrier Applications*, Advanced Materials 13(21):1641-1643, Nov. 2001.

J. Hauck, *Thermal Conductivity of Exoxy Resin-Aluminium (0 to 50%) Composites*, Journal of Materials Science 12 Letters, pp. 1689-1691, 1977.

H. Jullien et al. *The Microwave Reaction of Phenyl Glycidyl Ether with Aniline on Inorganic Supports: A Model for the Microwave Crosslinking of Epoxy Resins*, Polymer 37(15): 3319-3330, 1996.

A. Kareiva et al., *Carboxylate-Substituted Alumoxanes as Processable Precursors to Transition Metal-Aluminum and Lanthanide-Aluminum Mixed-Metal Oxides: Atomic Scale Mixing via a New Transmetalation Reaction*, Chemistry of Materials 8(9):2331-2340, 1996.

R. Kasemann et al., *Coatings for Mechanical and Chemical Protection Based on Organic-Inorganic Sol-Gel Nanocomposites*, New Journal of Chemistry 18(10):1117-1123, 1994.

H. Katz et al. *Handbook of Fillers and Reinforcements for Plastics*, Van Nostrand Reinhold Company, pp. 11-50, 1978.

Y. Kimura et al., *Coordination Structure of the Aluminum Atoms of Poly(Methylaloxane), Poly(Isopropoxylaloxane) and Poly[(Acyloxy)Alaxane]*, Polyhedron 9(2/3):371-376, 1990.

Y. Koide et al., $[Al_5(Bu)_5(_{82\ 3}\text{-OH})_2(\mu\text{-OH})_2(\mu\text{-}O_2CPH)_2]$: *A Model for the Interaction of Carboxylic Acids with Boehmite*, Organometallics 14:4026-4029, 1995.

Y. Koide et al., *Alumoxanes as Cocatalysts in the Palladium-Catalyzed Copolymerization of Carbon Monoxide and Ethylene: Genesis of a Structure-Activity Relationship*, Organometallics 15(9):2213-2226, 1996.

J. I. Kroschwitz et al., *Encyclopedia of Polymer Science and Engineering, vol. 6, Emulsion Polymerization to Fibers, Manufacture*, John Wiley & Sons, pp. 322-382, 1985.

C. Landry et al., *Siloxy-Substituted Alumoxanes: Synthesis from Polydialkylsiloxanes and Trimethylaluminium, and Application as Aluminosilicate Precursors*, J. Mater Chem. 3(6):597-602, 1993.

C. Landry et al., *From Minerals to Materials: Synthesis of Alumoxanes from the Reaction of Boehmite with Carboxylic Acids*, J. Mater. Chem 5(2):331-341, 1995.

P. LeBaron et al., *Polymer-Layered Silicate Nanocomposites: An Overview*, Applied Clay Science 15: 11-29, 1999.

A. MacInnes et al., *Chemical Vapor Deposition of Gallium Sulfide: Phase Control by Molecular Design*, Chemistry of Materials 5(9):1344-1351, 1993.

A. MacInnes et al., *Indium Tert-Butylthiolates as Single Source Precursors for Indium Sulfide Thin Films: Is Molecular Design Enough?* J. Organometallic Chemistry 449:95-104, 1993.

K. Nakamae et al., *Studies on Mechanical Properties of Polymer Composites by X-Ray Diffraction: 3. Mechanism of Stress Transmission in Particulate Epoxy Composite by X-Ray Diffraction*, Polymer 33(13):2720-2724, 1992.

S. Pasynkiewicz, *Alumoxanes: Synthesis, Structures, Complexes and Reactions*, Polyhedron 9(2/3):429-453, 1990.

H. Schmidt et al., *Chemistry and Applications of Inorganic-Organic Polymers*, Mat. Res. Soc. Symp. Proc., vol. 73, pp 739-750, 1986.

H. Schmidt et al., *Inorganic-Organic Hybrid Coatings for Metal and Glass Surfaces*, American Chenical Society, pp. 331-347, 1995.

H. Schmidt et al., *Sol-Gel-Based Inorganic-Organic Composite Materials*, American Chemical Society, pp. 183-194, 1994.

N. Shahid et al., *Use of Carboxylate-Alumoxanes as Functionalized Cross-Linking Agents in the Preparation of Composite Resin Materials*, 221st ACS National Meeting, San Diego, CA, Apr. 1-5, 2001.

N. Shahid et al., *Use of Carboxylate-Alumoxanes as Functionalized Cross-Linking Agents in the Preparation of Composite Resin Materials*, ACS Joint Southeast-Southwest Regional Meeting, Dec. 6-8, 2000.

M. Stevens, *Polymer Chemistry, An Introduction*, Second Edition, Oxford University Press, pp 374-379, 1990.

C. Vogelson et al., *Inorganic-Organic Hybrid and Composite Materials Using Carboxylate-Alumoxanes*, Proceedings of the 9th Cimtec-World Ceramics Congress, pp 499-506, Jun. 14-19, 1998.

C. Vogelson et al., *Inorganic-Organic Hybrid and Composite Resin Materials Using Carboxylate-Alumoxanes as Functionalized Cross-Linked Agents*, Chem. Mater. 12 (3):795-804, 2000.

C. Vogelson et al., *Fiber Reinforced Epoxy Resin Composite Materials Using Carboxylate-Alumoxanes as Cross-Linking Agents*, Mat. Res. Soc. Symp. Proc., vol. 581, pp 369-374, 2000.

C. Vogelson et al., *Epoxy Resin Materials Using Functionalized Carboxylate-Alumoxanes as Cross-Linking Agents*, ACS Meeting, Joint 55$^{th}$ Southwest/15$^{th}$ Rocky Mountain Regional Meeting, El Paso, Texas, Oct. 21-23, 1999.

C. Vogelson et al., *Inorganic-Organic Epoxy Resin Materials Using Functionalized Carboxylate-Alumoxanes as Cross-Linking Agents*, ACS Meeting, New Orleans, Louisiana, Aug. 21-26, 1999.

C. Vogelson et al., *Inorganic-Organic Epoxy Composite Materials Using Carboxylate-Alumoxanes*, ACS Meeting, Dallas, Texas, Mar. 29-Apr. 2, 1998.

C. Vogelson et al., Slides presented at 9$^{th}$ Annual World Ceramics conference in Florence, Italy, Jun. 1999.

G. Whitesides et al., *Molecular Self-Assembly and Nanochemistry: A Chemical Strategy for the Synthesis of Nanostructures*, Science 254:1312-1319, Nov. 1991.

B. Yoldas, *Alumina Gels that Form Porous Transparent $Al_2O_3$*, Journal of Materials Science 10:1856-1960, 1975.

* cited by examiner

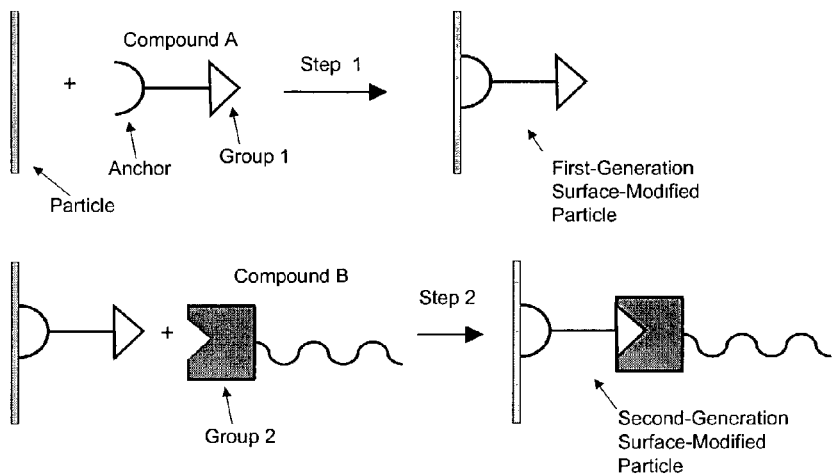
Figure 1. Two-step surface-modification process.
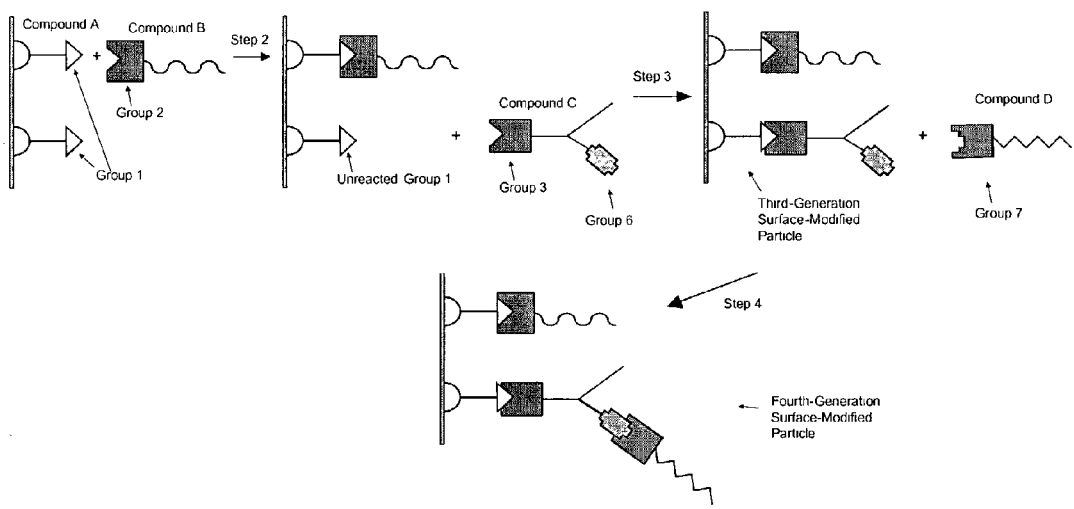
Figure 2. Step 2, Step 3, and Step 4 of a potentially four-step surface-modification process illustrating the manner in which multiple generations of surface-modification can be carried out.

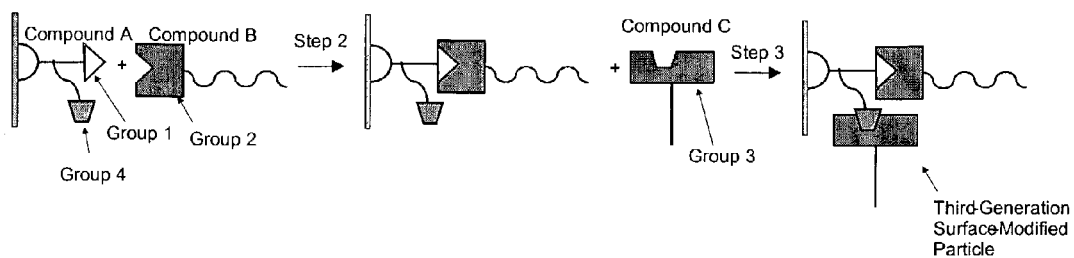
Figure 3. Step 2 and Step 3 of a three-step surface-modification process.
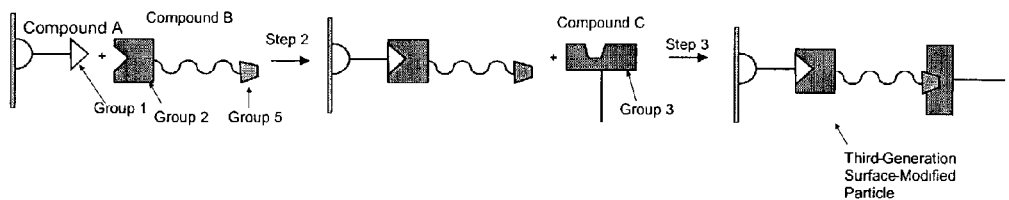
Figure 4. Step 2 and Step 3 of a three-step surface-modification process

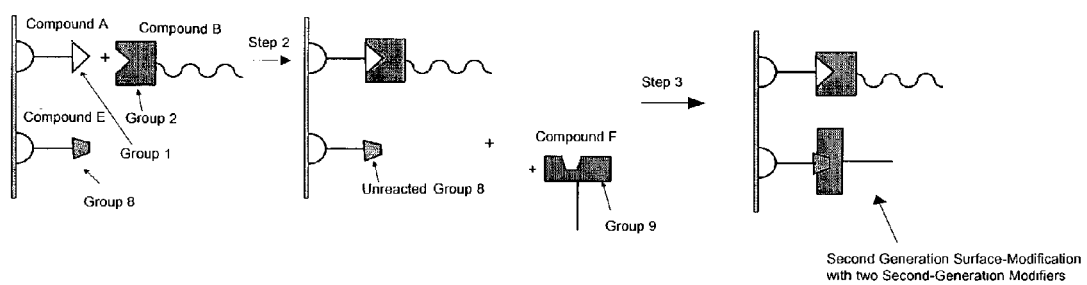
Figure 5. Step 2 and Step 3 of a three-step surface-modification process with two Second-Generation Modifiers.

SURFACE MODIFIED PARTICLES BY MULTI-STEP ADDITION AND PROCESS FOR THE PREPARATION THEREOF

STATEMENT REGARDING FEDERALLY SPONSORED RESEARCH OR DEVELOPMENT

This invention was made, at least in part, with funding from the National Science Foundation, Contract No. DMI-9901730, the Department of Energy, Contract No. DE-FG03-00ER82928 and the United States Navy Under Contract N68335-01-C-0176. Accordingly, the U.S. government may have certain rights in this invention.

BACKGROUND OF THE INVENTION

This invention relates generally to surface-modified particles of materials such as aluminum oxyhydroxides, iron oxyhydroxides, and clays, and methods for preparing the same.

Particulate fillers have long been known to impart desirable properties to a variety of polymeric materials. For example, mica increases the stiffness of phenol-formaldehyde plastics (A. King "Application of Fillers" in Plasticizers, Stabilizers, and Fillers, P. D. Ritchie ed, Iliffe Books, London, 1972.) Plate-like fillers have been known to improve the barrier properties of their composites (A. A. Gusev and H. R. Lusti, "Rational Design of Nanocomposites for Barrier Applications", Advanced Materials, 2001, Vol. 13(21), 1641–1643).

In many cases, it is advantageous to provide inorganic particles with an organic surface modification. Modifying the surface of particles that are added to a polymer matrix to form a composite can improve the wetting of the particles by the matrix and improve the dispersion of the particles in the matrix, thereby improving such properties of the composites as strength, toughness, and the ability to act as a barrier. Surface modifications can also improve the adhesion between the particles and the polymer, thereby improving the load transfer and the mechanical properties of the composite. For example, U.S. Pat. No. 4,091,164 teaches the modification of kaolin clays by mixing the clay particles with block copolymers of ethylene oxide and propylene oxide and then melting the polymers on the clay particles. Surface modifications have also provided particulate fillers the ability to bond with a matrix, as is described in e.g. U.S. Pat. No. 3,901,845, which teaches coupling of a mineral filler with a nylon matrix by an aromatic compound having a carboxyl group and a hydroxyl or amine group. PCT application WO 00/09578 also teaches the surface modification of a filler followed by coupling of the filler to an organic matrix.

Polymer-clay composites have received much attention in the past five years (LeBaron, Wang and Pinnavaia, Applied Clay Science, 1999, 15, 11–29), and most of this work has focused on alkylammonium-exchanged smectite clays. Addition of surface modified clays to polymers improves the properties of the polymer. For example, by adding a few percent loading of clay to nylon-6 increases the heat distortion temperature by 80° C. This increase makes structural applications possible under conditions where the pristine polymer would fail (deform). In another example, similar low loading levels of surface-modified clay increase the toughness and the tensile strength of thermoset materials such as elastomeric epoxies and polyurethanes. Furthermore, in glassy epoxy composites, clays greatly improve the yield strength and modulus under compression.

Although adding surface modified particles is an extremely important way of improving the properties of composite materials, the chemistries available for modifying a particle's surface in a single step are limited. Large carboxylic acids do not readily react with the surface of aluminum oxyhydroxides such as boehmite due to conformational and steric limitations. Likewise, large quaternary ammonium compounds diffuse very slowly into clay galleries, limiting the rate of production at which some surface-modified clays can be produced. Moreover, certain functional groups cannot be introduced in a one step modification because they undergo undesired side reactions.

U.S. Pat. No. 5,593,781 (Nass, et al.) describes surface modification of ceramic powders of nanometer size particles with small molecular weight organic compounds in a one-step process by dispersing the ceramic powder in water or an organic solvent and adding the low molecular weight organic compound.

Apblett et al. [Mat. Res. Symp. Proc. Vol. 249 1992] describe the formation of carboxy substituted particles from the reaction of pseudoboehmite and carboxylic acids in a one-step process.

Landry et al. [J. Mater. Chem. 1995, 5(2), 331–341] describe the reaction of $[Al(O)(OH)]_n$ with carboxylic acids to form $[Al(O)_x(OH)_y(O_2CR)]_n$ where $R=C_1-C_{13}$ and $2x+y+z=3$ using a one-step reaction.

U.S. Pat. No. 6,369,183 (Apr. 9, 2002) describes thermoset polymer networks formed from amine, hydroxyl, acrylic and vinyl substituted carboxylate-modified boehmite with low molecular weight polymer precursors.

U.S. Pat. No. 6,322,890 (Barron and Obrey) describes supra-molecular alkylalumoxanes comprising a) an aluminum-oxide nanoparticle, b) a linkage unit, and c) an alkylalumoxane. The alkylalumoxanes used in Barron and Obrey are distinct from the carboxylato-alumoxanes of Landry et al. and serve as co-catalyst for alkene polymerizations (e.g. methylalumoxane (MAO)) by an organometallic reaction. Thus, Barron and Obrey teach the use of an aluminum oxide nanoparticle as a base on which to attach additional alumoxane units. Significantly, Barron and Obrey link these alumoxanes to the particle surface with organometallic bonds.

In U.S. Pat. No. 4,349,389, inorganic metal-containing pigments (particularly titanium dioxide) are made dispersible in thermoplastics and paints by first rendering the pigment hydrophobic by coating it with an alkylbenzene sulfonic acid, then coating it further with a thermoplastic polymer. Significantly, no covalent bond is created between the first surface-modifying molecules and the subsequent molecules that are simply adsorbed onto the modified surface.

U.S. Pat. No. 4,764,495 (Rice), describes surface modification of clay minerals by hydrogenation followed by reaction with molecules containing unsaturated carbon-carbon bonds. This is a two-step modification in which the first step entails reacting the particle with an inorganic gas rather than an organic compound. U.S. Pat. No. 4,900,767, teaches a method of modifying clays by contacting the clay with an organic monomer or prepolymer which is subsequently polymerized in the presence of carbon monoxide.

U.S. Pat. No. 5,814,407 (Richard, Vaslin and Larpent) describe forming latex or silica particles having N-alkylglycosyl groups on the surface by reacting an amine, thiol or phenol-functionalized latex particle or silanol-functionalized silica particle with an N-alkylacrylamidoglycosyl group. The objective of this patent is to produce materials that can find applications as detection agents in biology. The patent does not describe methods for two-step surface modifications to silica; silanol groups are inherent in the surface of silica and the origin of the surface-bound amine, thiol or phenol groups is unclear. At any rate, the present invention relates neither to —O—Si—anchor groups nor to silica surfaces.

U.S. Pat. No. 6,224,846 (Hurlburt and Plummer) describes the formation of a modified boehmite alumina by reaction of boehmite with a sulfonic acid at temperatures between 90° C. and 300° C. and preferably between 150° C. and 250° C. However, the patent does not teach the reaction of a sulfonic acid group with boehmite followed by reaction of another organic group with the attached sulfonic acid group.

There is a need in the art for surface-modified particles and multi-step methods for preparing the same.

SUMMARY OF THE INVENTION

The present invention relates to a new class of surface modified particles and to a multi-step surface modification process for the preparation of the same. The multi-step surface modification process involves two or more reactions to produce surface-modified particles. These surface-modified particles are compatible with various host systems and have particular chemical reactivities that can be tailored. The initial step comprises the attachment of a reactive compound to the surface of the particle. The subsequent steps attach additional organic and inorganic compounds to the previously attached compounds through organic linkages.

More specifically, the present invention describes processes to make inorganic particles whose surface is modified by a multi-step surface modification process and the materials made by these processes. This multi-step surface modification process involves two or more reactions. The initial step (Step 1 in Figures) comprises the attachment of one or more reactive compounds to the surface of the inorganic particle. As used herein, "reactive" means the group or compound undergoes the desired reaction or can be activated to undergo the desired reaction. These reactive compounds (for example, Compound A, FIG. 1; Compounds A and E, FIG. 5) contain reactive functional groups comprising at least an anchoring group (Anchor, FIG. 1) that reacts or can be activated to react with the surface of the particle, and, another reactive functional group (Group 1, FIG. 1; Group 1 and Group 4, FIG. 3; Group 1 and Group 8, FIG. 5) that is available or can be activated for subsequent reactions. The subsequent (second) step attaches a second reactive compound (Compound B) to the previously attached Compound A. Compound B may be identical to or different from Compound A. Compound B contains at least one reactive group (Group 2, FIG. 1) that reacts or can be activated to react with the Group 1 of the Compound A forming a linkage (Step 2). Compound B may be organic, organometallic, and/or a coordination complex or metal complex and may be largely inorganic (such as a phosphazene or siloxane oligomer) so long as it contains a suitable reactive functional group as described below. Additional steps ($3^{rd}$, $4^{th}$, etc.) may be carried out following the same concept. For example, if a third step is carried out, this third step attaches a third compound (Compound C) to either Compound B or Compound A (FIGS. 2, 3, 4). Compound C may be identical to Compound A or to Compound B or may be different from both. Compound C contains at least a reactive group (Group 3) that reacts or can be activated to react either with unreacted Group 1 on Compound A (FIG. 2), with a third reactive group on compound A (Group 4, FIG. 3) or with a second reactive group of Compound B (Group 5, FIG. 4). It may be desired to use more than one compound with different reactive groups or different anchoring groups for any step or steps in the overall reaction (e.g. Step 1 in FIG. 5 and Step 3 in FIGS. 2, 3, and 5). Using different compounds provides the ability to have more than one type of group available for subsequent steps, and provide a particle that may contain more than one type of functional group. Parallel reactions may also be used, where 2 or more different reactive compounds are reacted in Step 1 and one, two or more reactive compounds are used in subsequent steps. It may also be desired to have unreacted groups at any stage of the process. Unreacted groups on the surface provide a way to tailor the density of modifiers on the surface. Unreacted groups may be made by blocking a reactive group with an unreactive group or by reacting the particle with compounds that do not react with the groups that will be unreacted. It may also be desired to have non-reactive groups at any stage of the process. Non-reactive groups are those that are not reactive toward attaching subsequent reactive compounds. Non-reactive groups may be those that contain a fluorescent or other identifiable label, those that are biologically active, or those that contain other groups that may be useful for a given application.

The linkage chemistry between reactive groups (e.g. Group 1 and Group 2) used in this invention is organic as described below, although the compounds used may contain metallic elements, organometallic bonds, coordination complexes and other non-organic groups and elements. In a preferred embodiment, Compound A and subsequent Compounds B, C, etc., are organic compounds containing only organic groups (defined as containing carbon and composed exclusively of the elements C, H, S, O, N, P, B, Cl, Br, F, I).

Organic linkage chemistry between Compound A and Compound B is defined to include only the elements C, H, S, O, N, P, and B. That is, after the coupling of Compound B to the particle, a preferably covalent, organic linkage formed between Compound B and the surface-modified particle will be between only these elements. Other elements may be present as e.g. counterions, but are not directly part of the covalent linkage binding Compound B to the particle. The linkages between the surface modifiers and all subsequently added Compounds (D, E, etc.) are similarly preferably limited to organic linkage chemistries. Other elements may certainly be part of Compound A, Compound B or subsequently added Compounds (see Example 18, for example), but these elements are not directly part of the covalent linkage bonding the Compounds to the particle. Preferred linkage chemistries include carbon-carbon single bonds, carbon-nitrogen bonds, carbon-phosporous bonds, and carbon-oxygen bonds. A class of particles are those formed without Michael-type additions.

Also provided herein are surface-modified particles. These particles contain one or more different groups on the surface, that in the most general sense, are linked to the surface of the particle through one or more different organic linkers.

BRIEF DESCRIPTION OF THE DRAWINGS

FIG. 1 shows a two-step modification process.

FIG. 2 shows steps 2, 3 and 4 of a potentially four-step surface-modification process illustrating the manner in which multiple generations of surface-modifications can be carried out.

FIG. 3 shows steps 2 and 3 of a three-step surface-modification process.

FIG. 4 shows steps 2 and 3 of a three-step surface modification process.

FIG. 5 shows steps 2 and 3 of a three-step surface-modification process with two first-generation modifiers and two second-generation modifiers.

DETAILED DESCRIPTION OF THE INVENTION

The particles of this invention are finely divided materials having particle size less then 5 mm and a surface shell comprising at least 5% of aluminum oxyhydroxide, iron oxyhydroxide, scandium oxyhydroxide, a solid solution of aluminum oxyhydroxide and iron oxyhydroxide, clay, or mixtures thereof. The core of the particles may be identical to or different from the surface shell, and it may be either an organic or inorganic material. The core may also be gelatinous or swollen polymer which would subsequently retract upon solvent removal to create essentially a hollow particle. Where the composition of the core differs from the composition of the shell, the particles are referred to as having a core-shell structure. One preferred class of particles is inorganic nanoparticles, i.e., those inorganic particles having no dimension greater than 200 nm.

As used herein, "alumoxane" is defined as an oligomeric aluminum compound represented by the general formulae $[(R)Al(O)]_n$ and $R[(R)Al(O)]_nAlR_2$, where R is an alkyl group such as methyl, ethyl, propyl, butyl or pentyl and n is an integer.

Preferred classes of particles are entirely inorganic. The most preferred class of particles is aluminum oxyhydroxides. Other preferred classes of particles are particles that do not contain silica. Other preferred classes of particles are particles that do not have a surface shell containing silica. Silica in the preceding sentences does not refer to clays. Preferred anchoring groups are organic acids, salts of organic acids, and $NR_4^+$ where each R is H or alkyl or alkylaryl and at least one R is alkyl or alkylaryl. The surface-modified particles prepared by the method of this invention do not contain terminal glycosyl groups or alumoxanes linked to the particle. The reactions used to prepare the particles herein do not form thermoset polymer networks.

Aluminum oxyhydroxide is to be broadly construed to include any material whose surface is or can be processed to form a shell or layer of boehmite, including specifically aluminum metal, aluminum nitride, aluminum oxynitride (AlON), $\alpha$-$Al_2O_3$, $\gamma$-$Al_2O_3$, transitional aluminas of general formula $Al_2O_3$, boehmite ($\gamma$-AlO(OH)), pseudoboehmite ($\gamma$-AlO(OH)•$xH_2O$ where $0<x<1$), diaspore ($\alpha$-AlO(OH)), and the aluminum hydroxides ($Al(OH)_3$) of bayerite and gibbsite. Thus, aluminum oxyhydroxide particles in this invention are any finely divided materials with particle sizes less than 5 mm and a surface shell comprising at least 5% of aluminum oxyhydroxide.

Boehmite and pseudoboehmite are aluminum oxyhydroxides of the general formula $\gamma$-AlO(OH)•$xH_2O$. When $x=0$ the material is called boehmite; when $x>0$ and the materials incorporate water into their crystalline structure they are known as pseudoboehmite. Boehmite and pseudoboehmite are also described as $Al_2O_3$*$zH_2O$ where, when $z=1$ the material is boehmite and when $1<z<2$ the material is pseudoboehmite. The above materials are differentiated from the aluminum hydroxides (e.g. $Al(OH)_3$, bayerite and gibbsite) and diaspore ($\alpha$-AlOOH) by their compositions and crystal structures. Boehmite is usually well crystallized with a structure in accordance with the x-ray diffraction pattern given in the JCPDS-ICDD powder diffraction file 21-1307, whereas pseudoboehmite is less well crystallized and generally presents an XRD pattern with broadened peaks with lower intensities. For the purposes of this specification, the term 'boehmite' implies boehmite and/or pseudoboehmite. Thus, boehmite particles in this invention are any finely divided materials with a particle size less then 5 mm and a surface shell comprising at least 5% of boehmite and/or pseudoboehmite.

Iron oxyhydroxide is also known as lepidocrocite, $\gamma$-FeO(OH). Boehmite and pseudoboehmite have a crystal structure that is isomorphous with lepidocrocite. Solid solutions of iron oxyhydroxide and boehmite are also known and may be referred to as either material when there is not a great predominance of one metal or the other. Thus, iron oxyhydroxide particles in this invention are any finely divided materials with a particle size less then 5 mm and a surface shell comprising at least 5% of iron oxyhydroxide.

Clay generally describes crystalline, plate-like, 2-dimensional layered lattice alumino silicates. Thus, for example, clays of the smectite, halloysite, illite, kaolinite, montmorillonite, palygorskite groups, and various other similar materials are here defined as clays. Thus, clay particles in this invention are any finely divided materials with a particle size less then 5 mm and a surface shell comprising at least 5% of clay.

In a preferred embodiment the particle core comprises metals (particularly aluminum alloys and iron alloys), inorganic oxides, inorganic oxyhydroxides, inorganic hydrates, inorganic salts, minerals, inorganic pigments, and glasses and the shell consists of aluminum oxyhydroxide. In another preferred embodiment, the core and shell of the materials are a solid solution of iron and aluminum oxyhydroxides. In a more preferred embodiment the core is aluminum, aluminum oxide, aluminum nitride, and other aluminum containing-minerals or salts and the shell is aluminum oxyhydroxide. In another more preferred embodiment the core is iron, iron oxide, an iron mineral or an iron containing salt, and the shell is iron oxyhydroxide. In another more preferred embodiment, the core and shell are both composed of the same clay material. In the currently most preferred embodiment the core and shell of the particles are both of the same material comprising boehmite [AlOOH•$x(H_2O)$] with a BET surface area of over 100 $m^2/g$.

The first step of the surface modification (Step 1 in Figures) comprises reactions that form a bond between the particles and the Anchor of Compound A. Bonds formed during Step 1 comprise covalent bonds, ionic bonds, hydrogen bonds, surface adsorption, and dipole—dipole interactions.

The second step (Step 2 in FIG. 1) comprises reactions that form a preferably covalent, organic linkage between a group on Compound B and a group on the surface-anchored Compound A. The nature of these exemplary linkage reactions is elaborated below.

A limited number (1–10) of surface modification steps (Step 3, Step 4, etc.) may be carried out after Step 2 if further modification is needed or desired for a desired application. When Step 3 is carried out, this step attaches a third compound (Compound C) to either Compound B or Compound A (FIGS. 2, 3, 4). Compound C contains at least a reactive group (Group 3) that reacts (or can be activated to react) either with unreacted Group 1 on Compound A (FIG. 2), with a third group on compound A (Group 4, FIG. 3), or with a second group of Compound B (Group 5, FIG. 4). Step 2 and Step 3 (and additional steps) may be carried out as separate sequential reactions or in a single pot.

The definition of each Group 2, Group 3, etc. is the same as the definition of Group 1, below. Step 3 and additional steps, comprise the same reactions described for the Step 2. During each step a reactive group of one compound reacts with a reactive group of another compound. If desired, a compound containing a non-reactive group may be added. The process to select the pair of reactive groups to carry out the Step 3 or additional step is the same as described for the Step 2.

We now further define the above Steps and Compounds in preferred embodiments.

Compound A is preferably a small molecule containing less than 40 carbon atoms and comprising at least a reactive anchoring group (the Anchor) that reacts with the surface of the particle and a reactive group (Group 1) that reacts with Compound B. In a preferred embodiment Compound A is an organic compound containing less then 14 carbon atoms, and in the most preferred embodiment Compound A is an organic compound containing less than 9 carbon atoms.

The Anchor is defined as the functional group on Compound A that reacts with the surface of the particles. In the preferred embodiment the Anchor is selected from the group consisting of: a carboxylic acid group, a carboxylate salt, a phosphonic acid, a phosphonate salt, a sulfonic acid, an organic sulfate, a sulfonate salt, a boronic acid group, a boronate salt, an amino group, a quaternary ammonium salt, a phosphine group, a quaternary phosphonium salt, an hydroxyl group, a thiol, a disulfide, and a sulfonium salt. In a more preferred embodiment the Anchor is a carboxylic, sulfonic or phosphonic acid when the particles are aluminum oxyhydroxide or iron oxyhydroxide. In another more preferred embodiment, the Anchor is a protonated amine, quaternary ammonium salt, protonated phosphine or phosphonium salt when the particles are clay. In most preferred embodiments, the Anchor is a carboxylic acid when the particles are aluminum oxyhydroxide or iron oxyhydroxide and the Anchor is a quaternary ammonium salt when the particles are clay.

The second step (Step 2) of the surface functionalization process is the reaction between a reactive group on Compound B and the reactive group (Group 1) on the particle-anchored Compound A. During Step 2, Group 1 of Compound A reacts with Group 2 of Compound B preferably forming a preferably covalent, organic linkage.

Group 1 is a chemical entity capable of undergoing a reaction or being activated to react in a reaction and comprises one or more of carbon-carbon double bonds, electrophilic carbon-carbon double bonds, carbon-carbon triple bonds, electrophilic carbon-carbon triple bonds, dienes, diynes, polyenes, aromatic rings, heteroaromatic rings, polyaromatic rings, cyclohaliphatic compounds, hydroxyl groups, alkoxides, ethers, phenols, phenolate esters, lactones, aldehydes, ketones, quinines, α,β-unsaturated carbonyl compounds, other (α,β-unsaturated compounds, carboxylic acids, carboxylate salts, anhydrides, hydroperoxides, enols, enones, epoxides, acetals, peroxycarboxylic acids, carbonates, primary, secondary and tertiary amines, ammonium salts, iminium salts, amine oxides, nitro groups, nitroso groups, azo groups, diazo groups, azides, nitrenes, nitriles, imines, Schiff bases, hydoxylamines, enamines, hydrazines, hydrazones, azines, semicarbazones, oximes, nitrates, nitrites, amides, imines, amidines, cyanohydrins, isocyanates, cyanates, urethanes, urea derivatives, carbammate esters, lactams, carbammic acids, thiols, disulfides, thiophenols, thioethers, thioesters, thioketones, thioaldehydes, sulfonic acids, sulfonates, organic sulfates, sulfoxides, sulfones, sulfinic acids, sulfines, sulfilimines, sultones, sulfonamides, sulfonium salts, thioacetals, sulfur ylides, isothiocyanates, thiocyanates, organic sulfites, thiocarbammic acids, phosphonic acids, phosphonates, phosphinic acids, phosphines, phosphonium salt, phosphorous ylides, phosphoranes, phosphites, alkyl halides, alkenyl halides, alkinyl halides, and aryl halides, carbonyl halides, sulfonyl halides, boronic acid groups, boronate salts, silanes, siloxanes, silyl halides, trialkylboranes alkylslyl derivatives, enolates, silyl enols, enamines, malonic esters, cyanoacetic esters, cyano acetamides, nitroalkanes, and the anions in Scheme 1. These possibilities are representative and not intended to be an exhaustive list of suitable reactive functional groups. Other examples are known to one of ordinary skill in the art. The terms above are as used in the art. All groups used in this invention are optionally substituted with elements and groups that do not prevent their desired reactions. Such substitutions are known in the art. Alkyl and alkenyl groups of substituents can be straight-chain, branched, or cyclic. Preferred alkyl groups have one to 6 carbon atoms, with methyl, ethyl and propyl groups being more preferred. Cyclic alkyl groups are preferably cyclohexyl or cyclopentyl groups. Preferred alkenes have one or two double bonds. Aryl groups contain one or more aromatic rings which are typically 5- or 6-member rings and which may be heterocyclic. Preferred aryl groups are optionally substituted phenyl groups which may be substituted with polar or charged (e.g., halogen, —COO—, or —COOR groups). Compounds containing "carboxylic acid" groups may contain one or more carboxylic acids.

Polymerization reactions indicate chemical reactions in which reactive monomers, oligomers, polymers, or reactive particles combine, through repeated, essentially identical chemical reactions, to form a chain with identifiable repeat units or a crosslinked network. The reactions and methods disclosed are not polymerization reactions. However, the particles formed may be used in a polymer system, for example.

Group 2 is a reactive group on Compound B selected from the functional groups of Group 1, such that a reaction between Group 1 on Compound A and Group 2 results in preferably a covalent, organic bond between Compound A and Compound B.

Step 2 is a reaction between two reactive functional groups (Group 1 and Group 2) as understood by those of ordinary skill in the art. Step 2 is carried out by selecting a combination of Group 1 and Group 2 functions that react with each other without causing undesired side-reactions, and by choosing the proper reaction conditions that allows the desired reaction between the chosen pair of functional groups to be carried out. Step 2 can be a substitution reaction (e.g. nucleophilic substitutions, electrophilic substitutions), a condensation reaction (e.g. esterifications, amidations), an addition reaction (to carbon-carbon multiple bonds, to carbon-heteroatom multiple bonds, cycloadditions), a free-radical reaction, or a concerted reaction or other reactions described herein, and those reactions known in the art to provide the desired reactions.

The following narrative illustrates the selection of appropriate compounds for Groups 1 and 2.

The selection of appropriate compounds and conditions is readily understood by one of ordinary skill in the art in view of the disclosure herein and organic chemistry textbooks (for example March, J. 2001; Fumiss, B, 1989).

Nucleophilic substitutions are reactions in which Group 1 is displaced by Group 2 or vice-versa. Substrates for nucleophilic substitutions are known to those of ordinary skill in the art and include aliphatic carbon atoms, compounds containing carbonyl groups, phosphorous-centered esters, and certain activated aromatic compounds among others. In the first case, Group 1 must be chosen to contain at least one group on a suitable substrate called by people skilled in the art a "leaving group" and Group 2 must be chosen from among those groups that are called by people skilled in the art "nucleophiles" (March, J. 2001, p. 389–674 and p. 850–893) as those terms are understood in the art. In the reverse case Group 2 must be chosen to contain a leaving group on a suitable substrate and Group 1 must be chosen to be a nucleophile. Nucleophilic substitutions comprise reactions in which both Group 1 and Group 2 are neutral species, one of the two groups carries either a positive or a negative charge, or both reagents carry a charge. The ring opening of epoxides and other heterocycles by a nucleophile is included in this class of reactions. The alkylation of alkyl halides by trialkylboranes and alkylsilyl derivatives is also included. These reactions are called alkylations when the nucleophile is a carbon-containing species. The leaving group for a nucleophilic substitution includes for example halogen ions, hydroxyl groups, water, alcohols, amines, sulfonates, thiols, epoxides, and carboxylates. The nucleophile for nucleophilic substitutions includes non-carbon nucleophiles and carbon nucleophiles. Non-carbon nucleophiles include alcohols, ammonia, alkoxides, amines, hydrazines, hydroxylamines and their derivatives, phosphines, $N_3^-$, $HS^-$, $NO3^-$, sulfides, thiols, thiolates, isocyanates, isothiocyantes, thiocyanates, carboxylates, phenols, phenolates, thiophenols and thiophenolates. Carbon nucleophiles include CN—, organometallic lithium derivatives, Grignard reagents, and other organometallic compounds, alkyl tin derivatives, trialkylboranes, alkylsilyl derivatives, enols, enolates, silyl enolates, enamines, anions from malonic esters, cyanoacetic esters, cyano acetamides, nitroalkanes, and the anions in Scheme 1.

In a preferred embodiment Group 1 is an alkyl halide or alkyl sulfonate and Group 2 is a primary amine (Example 1), a thiol, or a carboxylate (Example 3). In another preferred embodiment Group 1 is an amine or a thiol and Group 2 is an epoxide (Example 2), in this case the leaving Group 2 does not leave Compound B but it stays attached to it through an additional bond (that is unaffected by the substitution reaction). In another preferred embodiment both Group 1 and Group 2 are alcohols (Example 4).

Condensation reactions involving a carbonyl moiety are a subset of nucleophilic substitutions. Again, one of the two reacting groups (either Group 1 or Group 2) must be a nucleophile and the other (either Group 1 or Group 2) must be or must contain a leaving group (March, J. 2001, p. 389–674). In a preferred embodiment, Group 1 is an aromatic amine and Group 2 is an aromatic aldehyde. In this case Group 2 is not in itself a leaving group but it contains the leaving group that is water (Example 7). In another preferred embodiment Group 1 is an ester and Group 2 is an alcohol (Example 9) or an amine (Example 10).

Electrophilic substitutions are reactions in which an electrophile (either Group 1 or Group 2) substitutes a leaving group on a substrate (either Group 1 or Group 2, March, J. 2001, p. 675–849). Substrates for electrophilic substitutions comprise substituted and unsubstituted benzene rings, polyaromatic compounds and heteroaromatic compounds. Electrophiles for electrophilic substitutions include $CO_2$, $CHCl_3$, peroxides, peracids, aromatic diazonium salts, sulfonyl chlorides, alkyl halides, carboxylic acids and esters, alkenes, alkynes, acyl chlorides, anhydrides and mixed anhydrides, alcohols, ketones, aldehydes, ketenes, nitro compounds, nitriles, ethers, thiols, sulfates, sulfonates, epoxides, and cyclopropyl units. Leaving groups for electrophilic substitution reactions include $H^+$, $R_3Si^+$, $R_3Sn^+$, other alkylmetal cations, $I^+$, $RCO^+$, $Br^+$, $Cl^+$, $CH_3^+$, $R^+$, $CO_2$, $ArN_2^+$, $ArCHOH^+$, and $NO^+$. These groups are understood by one of ordinary skill in the art. In a preferred embodiment, electrophilic aromatic substitutions comprise Friedel-Crafts reactions (Example 6) and Mannich reactions on aromatic substrates (Example 8). A Bronsted or Lewis acid may be used as a catalyst for these reactions.

The addition to carbon-carbon or carbon-heteroatom multiple bonds is a reaction in which Group 1 contains a multiple bond and Group 2 adds to it (or vice-versa, March, J. 2001, p. 970–1298). These reactions comprise nucleophilic, electrophilic and radical additions. In preferred embodiment Group 1 is an amine or an alcohol and Group 2 is an organic isocyanate (Example 11). Another preferred embodiment is the conjugated addition of nucleophiles to electrophilic (activated) multiple bonds. This reaction is also called Michael addition or Michael-type addition. The electrophilic multiple bond for Michael-type addition includes activated carbon-carbon pi bonds of the type —C=C—Z, —C≡C—Z, —C=C—C=C—Z where Z is CHO, COR (including quinones), COOR, $CONH_2$, CONHR, $CONR_2$, CN, $NO_2$, SOR, $SO_2R$, SR, for example (March, J.; Smith M. B.; March's Advanced Organic Chemistry, Reactions, Mechanisms, and Structure, Fifth Ed., John Wiley& Sons, New York, 2001.). The nucleophile for Michael-type addition includes non-carbon nucleophiles and carbon nucleophiles. Non-carbon nucleophiles comprise alcohols, alkoxides, primary and secondary amines, hydrazines, hydroxylamines and their derivatives, phosphines, CN—, sulfides, thiols, thiolates, carboxylates, phenols, phenolates, thiophenols, and thiophenolates. Carbon nucleophiles comprise carbanions from β-ketoesters, malonate esters, trialkylboranes, alkylsilyl derivatives, enolates, silyl enols, enamines, and the anions in Scheme 1. When using a catalytic amount of base, the most effective carbanions are β-ketoesters, and malonate esters. Fluoride is an effective catalyst for Michael addition involving relatively acidic carbon compounds and silyl enol esters. Again, these examples are intended to be representative, and not exhaustive. Particles made by Michael-type addition reactions are discussed further in concurrently filed application Ser. No. 10/171,422.

In the most preferred embodiment aluminum oxyhydroxide or iron oxyhydroxide particles are surface modified with acrylic acid, methacrylic acid, or 2-acrylamido-2-methylpropanesulfonic acid (Step 1) then reacted with a primary amine at room temperature (Examples 2, 15, 16, 17, and 18), or a secondary amine at 60–80° C., or a thiol in the presence of a base catalyst. In another most preferred embodiment montmorillonite is modified with 3-(acrylamidopropyl)trimethylammonium chloride in the first step and then reacted with a primary amine (Example 15).

Electrophilic reagents that add to alkenes and alkynes includes water, mineral acids, carboxylic acids, and organosulfur and organoselenide chlorides, derivatives of Hg, Sn, Tl, and other metals, and hydrides of silicon and boron.

The addition of alcohols, animes, and organometal compounds to aldehydes and ketones form acetales, enamines, Schiff bases, or tertiary alcohols. Reactions of aldehydes and ketones with carbon-containing nucleophiles include the aldol condensation and the Knoevenagel condensation. Aldol condensations can be performed under either basic or acidic conditions. The acid-catalyzed condensation of aromatic aldehydes is of particular interest because it forms only one product (Claisen-Schmidt). The Knoevenagel reaction is the amino-catalyzed condensation of a rather acidic carbanion to a carbonyl compounds. Malonic esters, cyanoacetic esters, cyano acetamides, and nitroalkanes are effective nucleophiles under the Knoevenagel conditions. The product of the aldol, Claisen-Schmidt, and Knoevenagel condensations is usually the dehydrated, α,β-unsaturated derivative of the original adduct. The Mannich reaction is the condensation of an enolizable carbonyl compound with an iminium ion. The Witting reaction involves the attack of a phosphorous ylide (carbon-containing nucleophile) to an aldehyde or ketone with formation of a carbon-carbon double bond. Sulfur ylides can also be used in similar condensations.

Carboxylic acids and their derivatives (acyl chlorides, anhydrides, esters, and nitrites) give products from addition-elimination reactions. Reactions include esterification, ammidation, acylation of alcohols and amines, trans-esterification, trans-amination, and ring opening of lactones and lactames. The reaction of carboxylic acid derivatives with carbocations (enolates, organimetallic reagents, etc.) form ketones or tertiary alcohols. The self-condensation of esters is known as the Claisen condensation.

Other reactions include the addition of alcohols, amines, thiols, organometallics reagents and other nucleophiles to isocyanates, isocyanic acid, isothiocyanates, and isothiocyanic acid. The addition of alcohols to nitrites to form esters is also included. Other reactions include the reductive amination of aldehydes and ketones, the addtion of amines and thiols to carbon dioxide and carbon disulfide. Allyltrialkylsilanes add to aldehydes in the presence of Lewis acids to form allyl alcohols.

Free radical reactions are reactions where Group 1 or Group 2 or both are free-radical species or can generate free radical species under the reaction conditions. In the preferred embodiment free radical reactions are radical additions of a radical species generated with an initiator or with light (ether Group 1 or Group 2) to a substrate (either Group 2 or Group 1, March, J. 2001, p. 894–969). Substrates for the radical addition include aromatic compounds, reactive akanes, alkenes, alkynes, and carbonyl-containing species. Radical species may be generated from many chemical and photochemical systems known in the art, including azides, diazonium salts, diazo compounds, organometallic compounds, alkyl boranes, hydroperoxides, peroxides, and thiols. For example, the radical may originate from the thermal decomposition of a peroxide although the reactive Group 2 may be an RS radical generated in situ by hydrogen abstraction of the corresponding thiol. In a preferred embodiment Group 1 is methacrylic and Group 2 is a radical generated from a thiol with UV light (Example 12).

Cycloaddition reactions are reactions in which Group 1 and Group 2 add to each other resulting in the formation of a new ring (March, J. 2001, p. 389–674). Cycloadditions include thermal cycloadditions and photo cycloadditions. In thermal cycloadditions one of the two reacting groups is an alkene or an alkyne and the other includes a diene. Preferred alkenes are molecules bearing electron-attracting groups such as COR, COOR, CN, $NO_2$ Preferred dienes comprise molecules bearing an electron-donating group (Example 13). Alkenes, alkynes and dienes may be optionally substituted. Groups suitable for substitution include those groups that do not prevent the desired reaction.

In a preferred embodiment, the particles after the first step of modification containing reactive preferably organic Groups 1 are water-soluble. These particles are partially reacted with a larger Compound B containing reactive organic functional Groups 2 and this reaction makes the particle organic-soluble. The stoichiometry used in Step 2 is such that unreacted Groups 1 are left at the end of the reaction. The unreacted Groups 1 are then reacted with a Compound C containing a Group 3 in an organic solvent. (Example 2).

In another preferred embodiment, particles after the first modification step containing reactive organic Groups 1 are partially reacted with a larger molecular weight Compound B (greater than 400 amu, preferably greater than 1000 amu) containing reactive organic functional Groups 2 (Step 2). This Step attaches long steric stabilizers (preferably about 18 atoms or larger) to the particles. These stabilizers will keep the particles separate from each other during the Step 3. The stoichiometry used in the Step 2 is such that unreacted Groups 1 are left at the end of the reaction. The unreacted Groups 1 are then reacted with a relatively low-molecular weight Compound C (less than 400 amu, preferably less than 200 amu) containing two equal Groups 3 per molecule (Step 3). During this reaction no significant cross-linking occurs among particles because of the presence of the steric stabilizers introduced in Step 2 (Example 1).

All reactions above that are useful in preparing surface-modified particles may be used in this invention and form separate classes of reactions and methods. Particles of the invention may be formed using one particular class of reaction, or different classes of reaction described herein and known in the art. Some of the following examples are non-limiting illustrations of some of the presently preferred embodiments of the invention.

THE EXAMPLES

Example 1

In a 3 L round bottom flask equipped with an overhead mechanical stirrer and a reflux condenser, 200 g (2.8 mol Al) of boehmite with a BET surface area of over 200 $m^2/g$ (e.g. Catapal A from Sasol) was slurried in 1 L of water. To this was slowly added 95 g (0.475 mol) of 3-iodopropionic acid while stirring vigorously, adding additional water as necessary to maintain a low enough viscosity to ensure good mixing. This mixture was heated to 80° C. for 18 hours at ambient pressure. To this warm mixture 1 L of an ethanol solution containing 20% of a polyoxyalkyleneamine (e.g. XTJ-507 from Huntsman) was added. This ethanol solution was added while stirring and the temperature was maintained at 90° C. for another 16 hours. The product was then dried to a waxy solid, and is useful for improving the barrier properties of poly(lactic acid).

For example, poly(lactic acid) composites composed of poly(lactic acid) and the above surface-modified particles were mixed together in a Brabender internal polymer mixer at 180° C. The composites were then pressed into thin films (2–15 mil thick). Barriers to oxygen and water vapor were measured according to accepted ASTM methods (F1927 for oxygen and F1249 for water vapor), and were compared to pure poly(lactic acid). Poly(lactic acid) showed an oxygen permeation rate of 33.8 cc-mil/(100 $in^2$*day) while composites with 2.5% of the above surface-modified particles showed an oxygen permeation rate of 25.5 cc-mil/(100 $in^2$*day). Poly(lactic acid) showed a water vapor permeation rate of 17.2 gm-mil/(100 $in^2$*day) while composites with 5% of the above surface-modified particles showed a water vapor permeation rate of 9.9 gm-mil/(100 $in^2$*day).

In this example, illustrated in Scheme 2, compound A (as shown in FIG. 1) in Step 1 (not shown) contains a carboxylic acid as the Anchor group and an iodide as Group 1.

Compound B comprises a primary aliphatic amine as Group 2. Step 2 is a substitution reaction, specifically a nucleophilic substitution.

Example 2

As illustrated in Scheme 3, acrylic acid (25.7 g, 0.36 mol) was added to 1.5 L of an 80° C. aqueous slurry containing 154.3 g (2.17 mol Al) of boehmite with a BET surface area of over 200 m$^2$/g (e.g. Catapal A from Sasol). This mixture was heated at 80° C. for 20 hours and then spray-dried in a Yamato Pulvis Model GB-21 spray drier. It can be advantageous to convert the material to a dry powder to aid in transportation, storage, and handling. The dry material (15 g) was dispersed in 100 mL of water by gentle agitation. To this was added 9.8 g of liquid polyoxyalkyleneamine (XTJ-507 from Huntsman, 5 mmol) dispersed in about 100 ml of ethanol. After 40 minutes of stirring, the material was dried to a solid in a convection oven near room temperature. This dried material was then dispersed in acetone and 0.59 g (10 mmol) ethylene diamine was added to the solution. After 1 hour of stirring, 2.3 g (10 mmol) of HELOXY modifier 65 (a mono-functional glycidyl ether) was added while stirring the solution vigorously. After 1 hour, this product was cooled and used to prepare epoxy resins where it was found to improve the toughness of the product.

For example, epoxy resins composed of bis-phenol A diglycidyl ether (Epon 826) and 51 parts per hundred resin of a polyamide derivative of dimerized fatty acids (Versamid 140) were prepared by warming the ingredients to 45° C. and mixing them by hand for 1 minute with a glass stir rod to prepare roughly 25 g liquid resin mixture. This mixture was poured into a roughly 20 ml rectangular prism Teflon mold and cured for one hour at 60° C. followed by 1 hour at 100° C. before being cooled to room temperature and tested. Long rectangular rods were cut for flexural toughness testing; the toughness of the sample was taken as the area under the stress-strain curve divided by the nominal fracture surface area. Surface modified particles were added to the epoxy phase in their acetone dispersions and the acetone was removed by first stirring while heating for 3–4 hours on a hot plate then pulling vacuum while warming in a vacuum oven overnight. The toughness for the unmodified epoxy resin was 2.60 J/cm$^2$. Resins containing 1%, 2%, and 3% (inorganic content) of the above surface-modified particles exhibited toughness values of 3.74, 3.60, and 3.14 J/Cm$^2$, respectively.

In Step 1 (not shown in Scheme 3), Compound A (as shown in FIG. 1) contains a carboxylic acid as the Anchor and an activated carbon-carbon double bond as Group 1. Compound B contains an amine as Group 2. Step 2 is an addition reaction, in this case a Michael-type addition reaction. By limiting the amount of Compound B, not all of the activated carbon-carbon double bonds are used in Step 2. In Step 3, Compound C is ethylene diamine, which also reacts with any unreacted activated carbon-carbon double bonds. The product of Step 3 contains a free amino group (Group 6) which can undergo additional reactions as shown in FIG. 2. In Step 4, a mono-functional glycidyl ether (Compound D) containing an epoxide (Compound D, Group 7) reacts with the free amino groups of the partially reacted ethylene diamine and/or with the secondary amines formed in Steps 2 and 3 to give a fourth-generation surface-modified particle.

Example 3

This example illustrates first the conversion of the surface of alumina particles to boehmite, followed by modification of this surface with organic compounds.

In a 2 L pressure vessel provided with a mechanical stirrer, calcined α-alumina powder having an average particle size of 0.2 μm (RC-HP DBM without MgO alumina from Baikowski Malakoff) (500 g) was mixed with deionized water (1.3 L) and 30% wt. ammonia solution (237 g) in order to facilitate a hydrothermal treatment of the alumina surface. The reaction was heated at 190° C. for 25–50 hr under vigorous stirring. At this temperature the internal pressure was about 300–350 psi. After cooling, the samples were dried in a vented oven at 9° C. overnight. The pH of the treated alumina in water was neutral, suggesting that all the ammonia evaporated during drying. This step forms a boehmite layer on the surface of the alumina as demonstrated by the x-ray diffraction pattern of the product.

All of the hydrothermally-treated alumina from the previous step was suspended in a water/ethanol mixture (3 L) and 6-bromohexanoic acid (19.5 g, 0.1 mol) was added under stirring. The reaction was refluxed overnight at atmospheric pressure and then cooled to room temperature. A slurry of 32.5 g (0.1 mol) of the potassium stearate in 500 mL of ethanol was added under stirring at room temperature then the mixture was gently dried in a vented oven. This dry mixture (200 g) was finally ground and placed in an open Pyrex vessel inside a microwave oven. The powder was irradiated at 600 W for 3 minutes (Bram et. al. 1990). After cooling, the product was washed with 95% ethanol and centrifuged to remove unreacted carboxylates in the decanted supernatant.

In this example, illustrated in Scheme 4, compound A (as shown in FIG. 1) in Step 1 (not shown) contains a carboxylic acid as the Anchor group and a bromide as Group 1. Compound B comprises a potassium salt of a carboxylic acid as Group 2. Step 2 is a substitution reaction, specifically a nucleophilic substitution.

Example 4

2-Hydroxy-2-methylbutyric acid (118 g, 1 mol) was added to a suspension of boehmite (852 g, 12 moles Al) with a BET surface area of over 80 m$^2$/g (e.g. Catapal 200 from Sasol) in water (8 L) under vigorous stirring and the mixture was heated 18 hr at 90° C. The product was gently dried in a vented oven. This dried product (100 g) was suspended in 15% sulfuric acid in n-butanol and heated at 70° C. overnight (Fuer and Hooz, 1997). After cooling, the sulfuric acid was neutralized with NaHCO$_3$ and excess solvent was eliminated under vacuum.

In this example, illustrated in FIG. 10, compound A (as shown in FIG. 1) in Step 1 (not shown) contains a carboxylic acid as the Anchor group and a hydroxyl group as Group 1. Compound B comprises a hydroxyl group as Group 2. Step 2 is a condensation reaction to form an ether and yields a second-generation surface-modified particle.

Example 5

Boehmite (587 g, 8 moles of Al) with a BET surface area of over 200 m$^2$/g (e.g. Catapal A from Sasol) was suspended in water (1 L) with stirring. 2,4-Dihydroxyphenylacetic acid (168 g, 1 mole) was added with stirring to the boehmite suspension. After half of the acid was added the suspension became very viscous and 200 mL of DI-water was added before completing the addition. The sample was stirred for 5–10 min and more water (2.4 L) was added. The mixture was heated at 90° C. for 24 hours with stirring, then spray-dried to a white fine powder in a Yamato Pulvis Model GB-21 spray drier.

Potassium hydrogen carbonate (40 g) was added to a suspension of 2,4-dihydroxyphenylacetic acid modified boehmite (40 g) in 400 mL of water in a flask equipped with a condenser and a gas inlet tube. The mixture was gently heated for 4 hr at 80° C. on a water bath, then carbon dioxide was bubbled through the solution while the solution was vigorously refluxed for 30 minutes (Furniss, et. al., 1989). The FT-IR spectrum of the product acidified with HCl showed the presence of the carbonyl stretching band of the carboxylic acid groups confirming the formation of the desired product.

In this example, illustrated in Scheme 6, compound A (as shown in FIG. 1) in Step 1 (not shown) contains a carboxylic acid as the Anchor group and an activated aromatic ring as Group 1. Compound B comprises carbon dioxide as Group 2. Step 2 reacts the aromatic ring with an electrophile in an electrophilic aromatic substitution reaction to give a second-generation surface-modified particle.

Example 6

Boehmite (72 g, 1 mol) with a BET surface area of over 200 $m^2/g$ (e.g. Catapal A from Sasol) in 700 mL of water was reacted with butyric acid (15 g, 0.17 mol) for 4 hr. The product was then reacted with 2,4-dihydroxybenzoic acid (14 g, 0.09 mol) and refluxed overnight. The product was then spray-dried in a Yamato Pulvis Model GB-21 spray drier. The spray-dried product (50 g, 0.06 mol) was mixed with a 1-dodecene (20 g, 0.12 mol) and $H_2SO_4$ (4 g, conc.) and heated at 90° C. for 12 hrs (Flett, 1938; Croxall, et. al., 1934; ibid. 1935). The unreacted olefin was eliminated by distillation under vacuum.

In this example, illustrated in Scheme 7, compound A (as shown in FIG. 1) in Step 1 (not shown) contains a carboxylic acid as the Anchor group and an activated aromatic ring as Group 1. Compound B comprises an $\alpha,\beta$-unsaturated hydrocarbon as Group 2. Step 2 reacts the aromatic ring with an $\alpha,\beta$-unsaturated hydrocarbon in an electrophilic aromatic substitution reaction to give a second-generation surface-modified particle.

Example 7

4-Aminobenzoic acid (137 g, 1 moles) and boehmite dispersed in water (2500 g of gel containing 426 g of Catapal A by Sasol, 21 g of concentrated $HNO_3$ and water) were mixed and heated overnight at 90° C. and spray-dried to a powder in a Yamato Pulvis Model GB-21 spray drier. FT-IR of the product showed disappearance of the 4-aminobenzoic acid carboxyl stretching band at 1676 $cm^{-1}$.

The product from the previous step was suspended in ethanol (95%) and 4-nitrobenzaldehyde (150 g, 1 mol) was added. The reaction was refluxed 6 hours then cooled at room temperature (Furniss, 1989). The product was centrifuged to separate the solid derivative of the desired product from the solvent and unreacted reagents.

In this example, illustrated in Scheme 8, compound A (as shown in FIG. 1) in Step 1 (not shown) contains a carboxylic acid as the Anchor group and an aromatic amine as Group 1. Compound B comprises an aromtic aldehyde as Group 2. Step 2 reacts the aromatic amine with the aldehyde in a nucleophilic attack on an unsaturated carbonyl group to give a second-generation surface-modified particle.

Example 8

4-Acetylbenzoic acid (164 g, 1 mol) and boehmite (852 g, 12 mol Al) were refluxed overnight in a 1:1 water/ethanol mixture (6 L) under vigorous stirring. To the product (still in solvent) was added 100 g of 37% wt. formaldehyde in water, 120 mL of concentrated hydrochloric acid, and 2000 g of a polyoxyalkyleneamine (e.g. XTJ-507 by Huntsman). The mixture was refluxed for 2 hrs under vigorous stirring, cooled to room temperature and dried to a white greasy solid (Furniss, 1989).

In this example, illustrated in Scheme 9, compound A (as shown in FIG. 1) in Step 1 (not shown) contains a carboxylic acid as the Anchor group and an active hydrogen bound to a ketone group as Group 1. Compound B is generated in solution from the condensation of formaldehyde and an amine and comprises an iminium ion as Group 2, as reported by those skilled in the art. (March, J. 2001) Step 2 reacts the active hydrogen with the iminium ion intermediate generated in solution in a nucleophilic substitution reaction to give a second-generation surface-modified particle.

Example 9

In a 3 L round bottom flask equipped with an overhead mechanical stirrer, 200 g (2.8 mol Al) of boehmite with a BET surface area of over 200 $m^2/g$ (e.g. Catapal A from Sasol) was slurried in 0.5 L of water. To this was added 100 g (0.75 mol) of mono-ethyl adipate ($HO_2C(CH_2)_4CO_2C_2H_5$) while stirring vigorously, adding additional water as necessary to maintain a low enough viscosity to ensure good mixing. This mixture was heated to 80° C. for 8 hours at ambient pressure. The product was spray dried to a white powder in a Yamato Pulvis Model GB-21 spray drier.

10 g of this powder was suspended in 100 mL of toluene. 2.4 g of 1-octadecanol and 1 g of p-toluenesulfonic acid were added under stirring. The mixture was refluxed for 3 days under Dean-Stark conditions, followed by evaporation of the toluene.

In this example, illustrated in Scheme 10, compound A (as shown in FIG. 1) in Step 1 (not shown) contains a carboxylic acid as the Anchor group and an ester as Group 1. Compound B comprises a hydroxyl group as Group 2. Step 2 reacts the ester with the hydroxyl group in an trans-esterification reaction to give a second-generation surface-modified particle.

Example 10

In a 3 L round bottom flask equipped with an overhead mechanical stirrer, 426 g (6 mol Al) of boehmite with a BET surface area of over 200 $m^2/g$ (e.g. Catapal A from Sasol) was slurried in 0.5 L of water. To this was slowly added 174 g (1 mol) of mono-ethyl adipate ($HO_2C(CH_2)_4CO_2C_2H_5$) while stirring vigorously, adding additional water as necessary to maintain a low enough viscosity to ensure good mixing. This mixture was heated to 80° C. for 8 hours at ambient pressure then spray dried in a Yamato Pulvis Model GB-21 spray drier.

The spray dried material (10 g) was suspended in toluene and 20 g of a polyoxyalkyleneamine (e.g., XTJ-507 from Huntsman) was added. This mixture was refluxed overnight then the toluene was allowed to evaporate, leaving a waxy solid.

In this example, illustrated in Scheme 11, compound A (as shown in FIG. 1) in Step 1 (not shown) contains a carboxylic acid as the Anchor group and an ester as Group 1. Compound B comprises an amine group as Group 2. Step 2 reacts the ester with the amine in a trans-amidation reaction to give a second-generation surface-modified particle.

Example 11

A mixed lactic/acrylic surface modified particle was prepared by slowly adding 100 mL of an aqueous solution containing 10 g (0.14 mol) acrylic acid and 25.2 g (0.28 mol) lactic acid to 0.5 L of aqueous slurry containing 154.3 g (2.14 mol Al) of boehmite with a BET surface area of over 200 m 2/g (e.g. Catapal A from Sasol). Monomethylether hydroquinone (MEHQ, 0.5 g) was added to inhibit acrylate polymerization. Additional water (to approximately 1.5 L) was added during acid addition and boehmite dispersion to control the viscosity of the mixture. This mixture was then heated at 80° C. for 14 hours while stirring gently. To this mixture was added about 1 L of an ethanol solution containing 220 g of a polyoxyalkyleneamine (e.g. XTJ-507 from Huntsman). This mixture was then thoroughly dried and taken up in anhydrous 2-butanone under an argon atmosphere. To this 2-butanone mixture was added 90 g (0.40 mol) of isophorone diisocyanate; which was allowed to react at 40° C. for 6 hours before allowing the 2-butanone to evaporate, leaving a hydrophobic waxy solid. This product is useful for improving barrier properties in polyurethane coatings.

In this example, illustrated in Scheme 12, compound A (as shown in FIG. 5) in Step 1 (not shown) contains a carboxylic acid as the Anchor group and an activated carbon-carbon double bondactivated carbon-carbon double bond as Group 1. Compound E (as shown in FIG. 5) in Step 1 (not shown) contains a carboxylic acid as the Anchor group and a hydroxyl group as Group 8. Compound B comprises an amine as Group 2. Step 2 reacts the activated carbon-carbon double bond with amine in a Michael-type addition reaction. Compound F comprises an isocyanate group as Group 9. Step 3 then reacts the hydroxyl group (Group 8) with the isocyanate group (Group 9) through an addition reaction with an $\alpha,\beta$-unsaturated C—N bond to give a second-generation surface-modified particle with two second-generation modifiers.

Example 12

Methacrylic acid (23.0 g, 0.27 mol) was slowly added to a 3L round bottom flask containing 0.5 L of a stirred aqueous suspension of 154.3 g (2.14 mol Al) of boehmite with a BET surface area of over 200 m$^2$/g (e.g. Catapal A from Sasol). Monomethylether hydroquinone (MEHQ, 0.5 g) was added to inhibit acrylate polymerization. About 1 L water was added during the addition of the methacrylic acid. This mixture was heated to 80° C. and held there for 8 hours, then cooled to room temperature and spray dried in a Yamato Pulvis Model GB-21 spray drier. This solid (150 g) was warmed to 45° C. under argon and mixed while adding 55 g (0.19 mol) of liquid 1-octadecanethiol. With this mixture stirring to create fresh surface, the mixture was irradiated with 254 nm ultraviolet light for 30 minutes at an intensity of 5 mW/cm$^2$. This product is useful for improving the barrier properties of polysulfides.

In this example, illustrated in Scheme 13, compound A (as shown in FIG. 1) in Step 1 (not shown) contains a carboxylic acid as the Anchor group and an activated carbon-carbon double bond as Group 1. Compound B comprises thiol group as Group 2. Step 2 reacts the activated carbon-carbon double bond with the thiol in a free radical addition reaction to give a second-generation surface-modified particle.

Example 13

In a 3 L round bottom flask equipped with an overhead mechanical stirrer, 426 g (6 mol Al) of boehmite with a BET surface area of over 200 m$^2$/g (e.g. Catapal A from Sasol) was slurried in 1 L of deoxygenated water. To this was slowly added 112 g (1 mol) of 2,4-hexadienoic acid (sorbic acid) while stirring vigorously, adding additional water as necessary to maintain a low enough viscosity to ensure good mixing. Monomethylether hydroquinone (MEHQ, 05 g) was added to inhibit polymerization. This mixture was heated to 80° C. for 8 hours under argon atmosphere at ambient pressure. A dry powder was isolated by spray drying in a Yamato Pulvis Model GB-21 spray drier.

The spray-dried sorbic acid product (50 g) was loaded in a reactor vessel equipped with a reflux condenser with 6 g (0.06 mol) of solid maleic anhydride. The vessel was then heated to 210° C. and stirred at this temperature for 1 hour. The product was isolated by extracting any unreacted maleic anhydride with acetone.

In this example, illustrated in Scheme 14, compound A (as shown in FIG. 1) in Step 1 (not shown) contains a carboxylic acid as the Anchor group and a diene as Group 1. Compound B comprises an $\alpha,\beta$-unsaturated hydrocarbon as Group 2. Step 2 reacts the diene with an $\alpha,\beta$-unsaturated hydrocarbon in a Diels-Alder cycloaddition reaction to give a second-generation surface-modified particle.

Example 14

2-Acrylamido-2-methylpropanesulfonic acid (207 g, 1 mol) and boehmite (426 g, 6 mol Al) were heated to 60° C. for 4 hours in water under vigorous stirring. Monomethylether hydroquinone (MEHQ, 05 g) was added to inhibit polymerization. Water was added as necessary to maintain a low enough viscosity to ensure good mixing. The product was spray dried to a white powder in a Yamato Pulvis Model GB-21 spray drier.

This powder (10 g) was suspended in 100 mL of water. A polyoxyalkyleneamine (e.g., XTJ-507 from Huntsman) (2.4 g) was added under stirring. The mixture was stirred for two hours at room temperature. The material was isolated by drying in a vented oven at 55° C. overnight, and was isolated as a waxy solid.

In this example, illustrated in Scheme 15, compound A (as shown in FIG. 1) in Step 1 (not shown) contains a sulfonic acid as the Anchor group and an activated carbon-carbon double bond as Group 1. Compound B comprises an amine as Group 2. Step 2 reacts the activated carbon-carbon double bond with the amine in a Michael-type addition reaction to give a second-generation surface-modified particle.

Example 15

20 g Montmorillonite (CEC=1.1 meq/g) was suspended in distilled water. 3-(Acrylamidopropyl)trimethylammonium chloride (8.6 g, 0.042 mol; twofold excess with respect to the CEC) was added to the suspension. Monomethylether hydroquinone (MEHQ, 0.5 g) was added to inhibit acrylate polymerization. The suspension was heated to 80° C. overnight. The suspension was filtered and washed until the filtrate shows no evidence of chloride anion (via addition of silver nitrate to the filtrate). The ammonium ion modified montmorillonite was then re-suspended in water and heated to 70° C. Octadecylamine (5.1 g; 1:1 with respect to the ammonium ion modifier bound to the montmorillonite) was added to ethanol and heated to 70° C. to disperse the octadecylamine. The dispersed octadecylamine solution was then added to a heated (70° C.) aqueous ammonium ion modified montmorillonite and stirred for two hours. The resulting material was dried to a waxy solid.

In this example, compound A (as shown in FIG. 1) in Step 1 contains a quaternary ammonium ion as the Anchor group and an activated carbon-carbon double bond as Group 1. Compound B comprises an amine as Group 2. Step 2 reacts the activated carbon-carbon double bond with the amine in a Michael-type addition reaction to give a second-generation surface-modified particle.

Example 16

Iron oxyhydroxide (90 g, 1 mol Fe; lepidocrocite, γ-FeOOH) is dispersed in water using acrylic acid (12 g, 0.17 mol) (Al:acrylic-acid=6:1 molar ratio) and heated to 80° C. overnight. The resulting acrylate-modified lepidocrocite materials are then spray-dried in a Yamato Pulvis Model GB-21 spray drier. The spray-dried acrylate-modified lepidocrocite materials are then redispersed into water. Ethanolamine (10.4 g, 0.17 mol) is added to the dispersed surface modified lepidocrocite and the sol is then stirred at room temperature for two hours. The resulting material is a surface-modified lepidocrocite particle containing the adducted ethanolamine (e.g. lepidocrocite-O(CO)—$CH_2CH_2NHCH_2CH_2OH$).

In this example, compound A (as shown in FIG. 1) in Step 1 contains a carboxylic acid as the Anchor group and an activated carbon-carbon bond as Group 1. Compound B comprises an amine as Group 2. Step 2 reacts the activated carbon-carbon bond with the amine in a Michael-type addition reaction to give a second-generation surface-modified particle.

Example 17

Acrylic acid, 25.7 g (0.36 mol), was added to 0.5 L of aqueous slurry containing 154.3 g (2.17 mol Al) of boehmite with a BET surface area of over 200 $m^2/g$ (e.g. Catapal A from Sasol). Additional water was added during acid addition and boehmite dispersion to control the viscosity of the mixture. Monomethylether hydroquinone (MEHQ, 0.5 g) was added to inhibit acrylate polymerization. This mixture was heated at 80° C. for 8 hours and then spray dried in a Yamato Pulvis Model GB-21 spray drier. The dry material from the previous step was dispersed in 500 mL of water by gentle agitation. To this was added 13.3 g (0.007 mol) of a polyoxyalkyleneamine (e.g. XTJ-507 from Huntsman). After 40 minutes of stirring, 1.6 g (0.027 mol) ethylenediamine is added. After 40 minutes of stirring, 25 g (~0.027 mol) monomethacryloxypropyl-terminated polydimethylsiloxane (Gelest, 800–1000 MW) is then added and stirring continued for an additional 40 minutes. This product was dried in a warm ventilated oven to give a waxy solid. This product is useful for improving the barrier properties of silicone-containing polymers.

In Step 1 (not shown), Compound A (as shown in FIG. 1) contains a carboxylic acid as the Anchor and an activated carbon-carbon double bond as Group 1. Compound B contains an amine as Group 2. Step 2 is a addition reaction, in this case a Michael-type addition. By limiting the amount of Compound B, not all of the activated carbon-carbon double bonds are used in Step 2. In Step 3, Compound C is ethylene diamine, which also reacts with any unreacted activated carbon-carbon double bonds. The product of Step 3 contains a free amino group (Group 6) which can undergo additional reactions as shown in Scheme 16. In Step 4, a monomethacryloxypropyl-terminated polydimethylsiloxane (Compound D) containing an activated carbon-carbon double bond group (Group 7) reacts with the free amino groups of the partially reacted ethylene diamine to give a fourth-generation surface-modified particle.

Example 18

As illustrated in Scheme 17, 25.7 g (0.36 mol) acrylic acid was added to 0.5 L of aqueous slurry containing 154.3 g (2.17 mol Al) of boehmite with a BET surface area of over 200 $m^2/g$ (e.g. Catapal A from Sasol). Additional water was added during acid addition and boehmite dispersion to control the viscosity of the mixture. Monomethylether hydroquinone (MEHQ, 0.5 g) was added to inhibit acrylate polymerization. This mixture was heated at 80° C. for 8 hours and then spray dried in a Yamato Pulvis Model GB-21 spray drier. The dry material from the previous step was dispersed in 500 mL of water by gentle agitation. To this was added 13.3 g (0.007 mol) of a polyoxyalkyleneamine (e.g. XTJ-507 from Huntsman). After 40 minutes of stirring, 1.6 g (0.027 mol) ethylenediamine is added. After 40 minutes of stirring, 25 g (0.027 mol) zinc acrylate is then added and stirring continued for an additional hour. This product was dried in a warm ventilated oven. This product is useful for improving the thermal stability of polyamides.

In Step 1 (not shown), Compound A (as shown in FIG. 1) contains a carboxylic acid as the Anchor and an activated carbon-carbon double bond as Group 1. Compound B contains an amine as Group 2. Step 2 is an addition reaction, in this case a Michael-type addition. By limiting the amount of Compound B, not all of the activated carbon-carbon double bonds are used in Step 2. In Step 3, Compound C is ethylene diamine, which also reacts with any unreacted activated carbon-carbon double bonds. The product of Step 3 contains a free amino group (Group 6) which can undergo additional reactions as shown in FIG. 2. In Step 4, zinc acrylate (Compound D) containing an acrylic group (Group 7) reacts with the free amino groups of the partially reacted ethylene diamine to give a fourth-generation surface-modified particle.

Example 19

This example illustrates first the conversion of the surface of AlN particles to boehmite, followed by modification of this surface with organic compounds.

In a glass reaction flask provided with a mechanical stirrer (magnetic type), aluminum nitride powder having an average primary particle size of 107 nm (Nanotechnologies, Austin, Tex.) (1 g) was mixed with de-ionized water (5 mL). The mixture was heated to boiling and the water was vaporized over the period of 10 minutes, leaving a dry powder. X-ray diffraction analysis of the dry powder indicated that a portion of the aluminum nitride was converted to boehmite. The XRD pattern for the powder contained peaks assigned to boehmite: 14.14°, 28.1°, 38.2°, 49.06°, 65.12°, and 71.74° 2-theta, as well as peaks assigned to AlN: 33.38°, 36.38°, 38.28°, 45.04°, 50.16°, 59.64°, 66.26°, 69.84° 71.68°, and 72.84° 2-theta. Adding more than 5 mL water (an amount that requires 30 minutes to vaporize) will result in converting all of the AlN to beohmite. Adding less than 5 mL of water (an amount requiring less than 10 minutes of time to vaporize) converts less of the AlN to boehmite. The external layer of boehmite was estimated to have an average thickness of 10 nm. The dry powder of AlN core, boehmite shell particles (0.44 g), acrylic acid (0.014 g) and methyl ether of hydroquinone (MEHQ, a radical reaction inhibitor) (500 ppm to acrylic acid) were added to xylene (17 g) and refluxed for 36 hours in the presence of an ambient atmosphere. The carboxylic acid group of acrylic acid reacts with the surface boehmite to form organic modified core/shell particles. At this point, the reaction was removed from the heat source and phenethylamine (0.008 g) was added to the particle/xylene mixture and stirred for 30 minutes. The xylene solvent was removed under vacuum and the surface modified particles were added (3% by weight) to epoxy resins and cured to make epoxy polymers with increased thermal conductivities.

Example 20

As illustrated in Scheme 18, acrylic acid (25.7 g, 0.36 mol) was added to 1.5 L of an 80° C. aqueous slurry containing 154.3 g (2.17 mol Al) of boehmite with a BET surface area of over 200 m 2/g (e.g. Catapal A from Sasol). This mixture was heated at 80° C. for 20 hours and then spray-dried in a Yamato Pulvis Model GB-21 spray drier. The dry material (15 g) was then dispersed in 100 mL of water by gentle agitation and warmed to 60° C. To this was added 5.2 g of octadecylamine (19 mmol) dispersed in about 50 ml of warm ethanol. After 1 hour of stirring, the material was dried to a solid in a convection oven near room temperature. This dried material was then ground to a fine powder.

This product is more easily dispersed in polypropylene where it serves to increase the heat deflection temperature. The samples were prepared by mixing polypropylene and the above surface-modified particles in a Haake twin-screw extruder at 200° C. and then injection molded. The prepared samples contained 10% of surface-modified particles. Heat distortion temperature was measured according to ASTM D256. The polypropylene composite was compared to pure polypropylene. The two samples showed a clear trend in which the composite material showed a lower distortion at a given temperature. At 60° C., pure polypropylene was displaced 0.8 mm while the composite was displaced 0.6 mm. At 93° C., pure polypropylene was displaced 1.7 mm while the composite was displaced 1.4 mm.

Although the description above contains many specificities, these should not be construed as limiting the scope of the invention, but rather providing illustrations of some of the preferred embodiments of the invention. For example, different synthesis methods that are known to one of ordinary skill in the art may be used with the teachings herein to synthesize surface-modified particles. Also, different reactants may be used than those specifically exemplified herein. Those of ordinary skill in the art will be aware of materials and methods that are functional equivalents of the specific materials disclosed herein. All such equivalents are encompassed by this invention. All references cited herein are incorporated by reference to the extent not inconsistent with the disclosure herewith.

REFERENCES

G. Bram, A. Lumpe, M. Majdoub, E. Gutierrez, E. Ruiz-Hitzky, Tetrahedron, 46, 5167, (1990).

F. Effenberg, K. Dranz, S. Forser, W. Muller, Chem. Ber., 114, 173, (1981).

Flett, L. H., U.S. Pat. No. 2,134,712 (1938); W. Croxall, F. Sowa, J. Nieuwland, J. Am. Chem. Soc., 56, 2054 (1934), 57 1549 (1935).

H. Fuer, J. Hooz, "Methods of Forming the Ether Linkage", in The Chemistry of the Ether Linkage, Ed. Saul Patai, Interscience Library, (1997), p. 458–459.

B. Furniss, A. Hannaford, P. Smith, A. Tatchell, Voegel's textbook of practical organic Chemistry, 5$^{th}$ Ed., Longman, 1989, p. 1067, 905, 1053.

March, J.; Smith M. B.; March's Advanced Organic Chemistry, Reactions, Mechanisms, and Structure, Fifth Ed., John Wiley& Sons, New York, 2001.

B. Furniss, A. Hannaford, P. Smith, A. Tatchell, Voegel's Textbook of Practical Organic Chemistry, 5th Ed., Longman, 1989

Scheme 1
Some carbon nucleophiles.

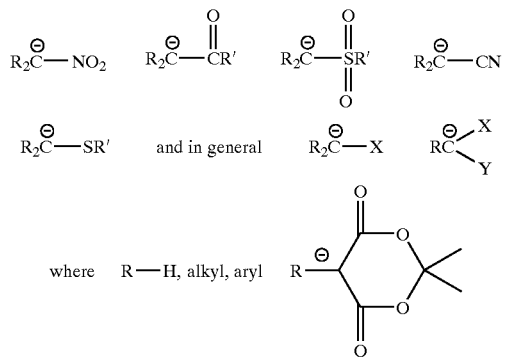

Scheme 2
An example of a nuclophilic substituion to an aliphatic or aromatic carbon. R can be H or aliphatic or aromatic but at least one is aliphatic or aromatic.

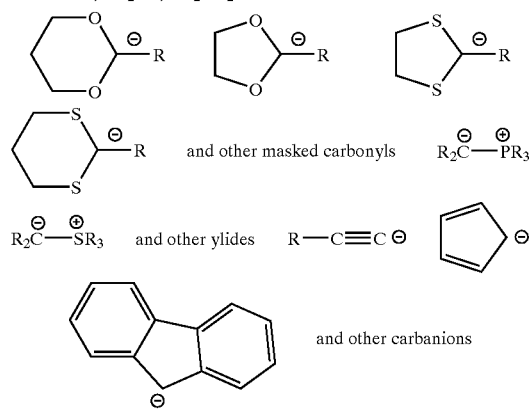

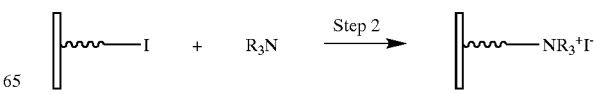

Scheme 3
An example of the nucleophilic ring opening of epoxies.

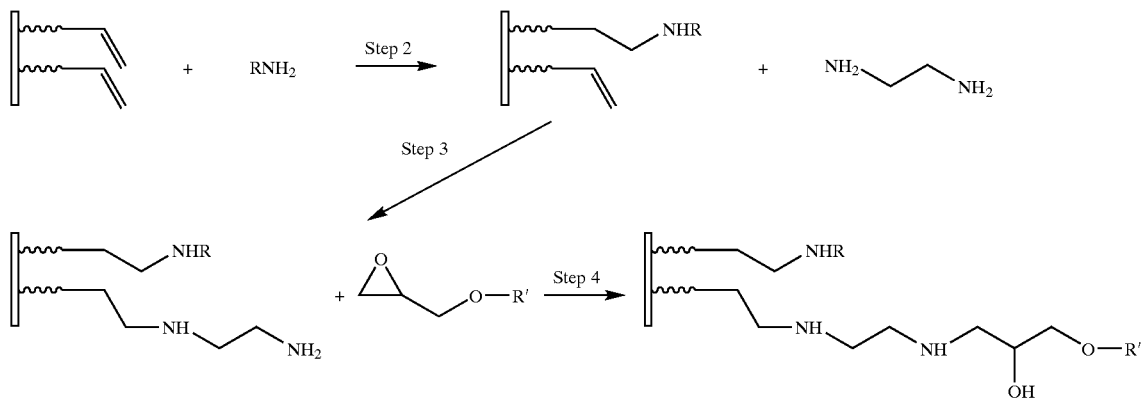

Scheme 4
An example of the formation of ester group alkylation of carboxylates.

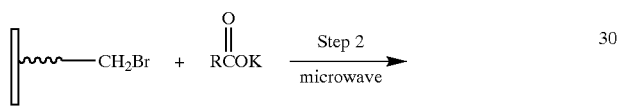

Scheme 5
An example of the formation of ethers in acidic media.

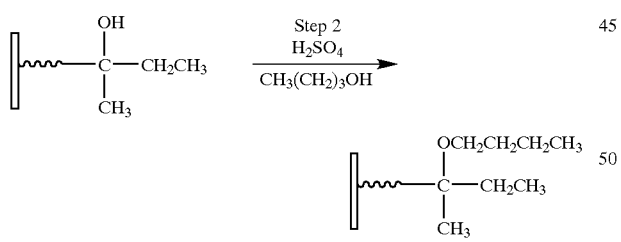

Scheme 6
An example of an electrophilic aromatic substitution as illustrated by a Kolbe-Schmitt reaction.

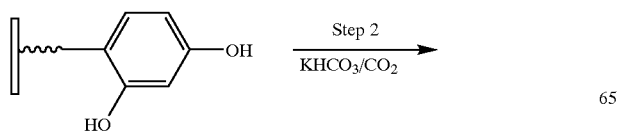

-continued

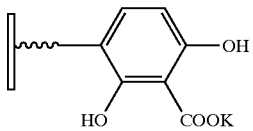

Scheme 7
An example of the Friedel-Craft Alkylation of Phenols.

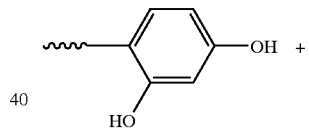

Scheme 8
An example of the formation of a Schiff Base.

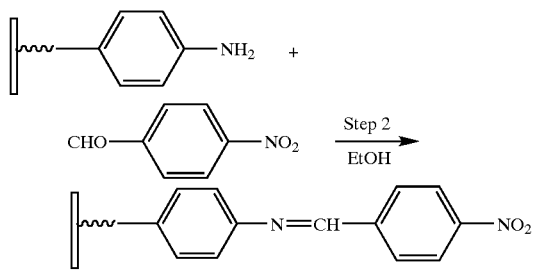

Scheme 9
An example of the Mannich reaction for surface modification.

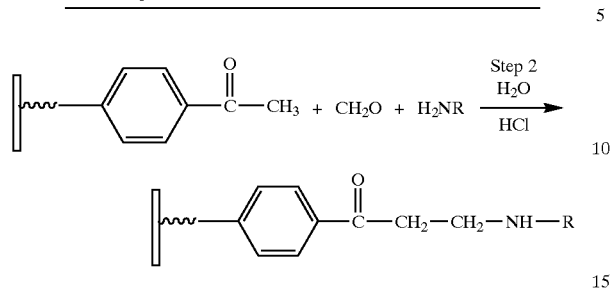

Scheme 10
An example of surface modification by trans-esterification.

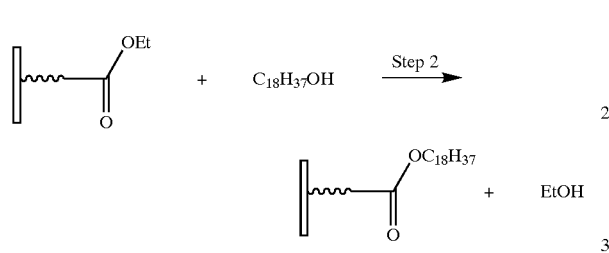

Scheme 11
An example of surface modification by trans-amidation.

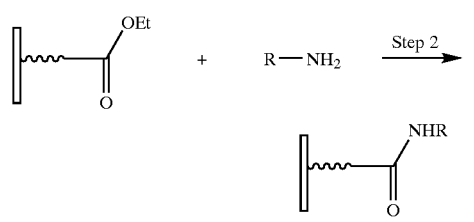

Scheme 12
An example of surface modification by addition to a carbon-hetero atom multiple bond. Above, R is, in this case, the polyoxyalkyleneamine oligomer, and R' is the cycloaliphatic core of the isophorone diisocyanate.

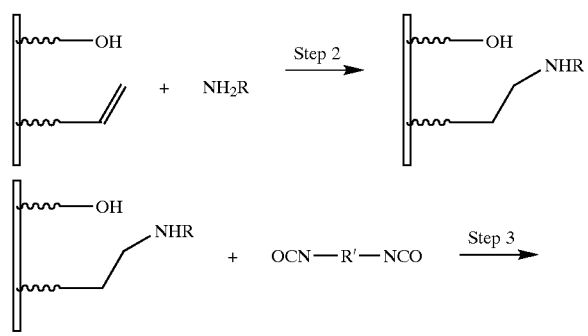

-continued

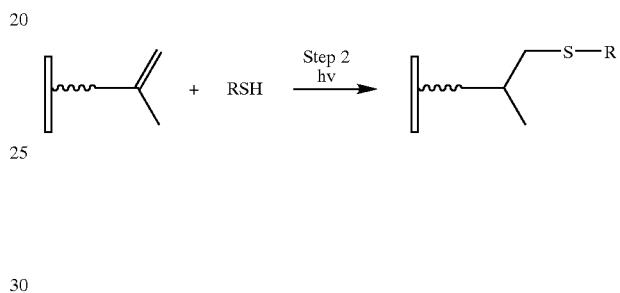

Scheme 13
An example of surface modification by a free radical addition reaction.

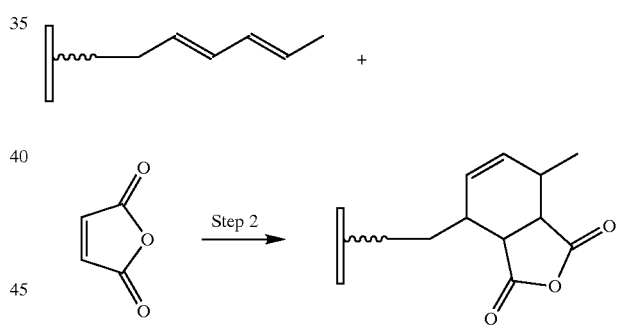

Scheme 14
An example of surface modification by a Diels-Alder cycloaddition reaction.

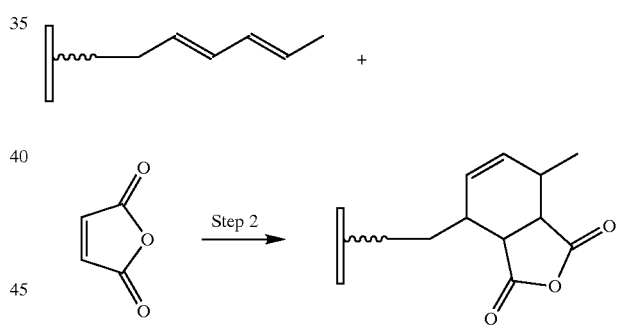

Scheme 15
An example of a surface modification with a sulfonic acid where the linking group is the product of a Michael-type addition.

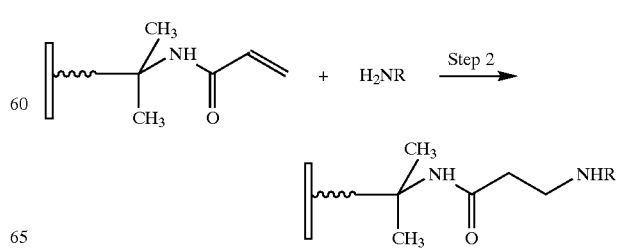

Scheme 16

An example of surface-modification using an inorganic polymer.

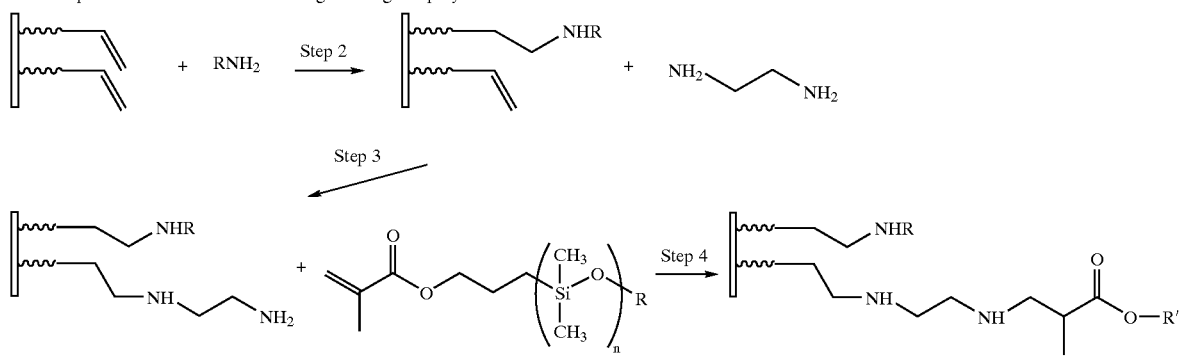

Scheme 17

An example of the surface-modification with an inorganic or organometallic compound.

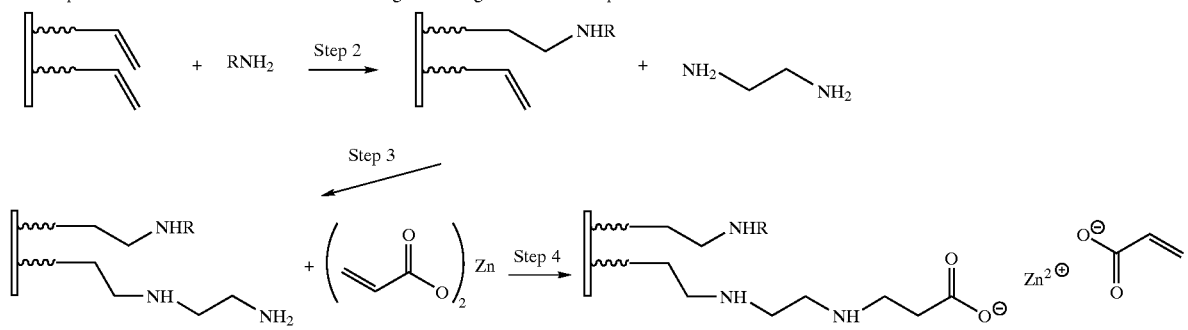

Scheme 18

An example of surface-modification by Michael-type addition of octadecyl amine when R is the octadecyl group.

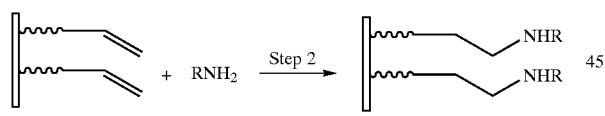

We claim:

1. A method of producing a surface-modified aluminum oxyhydroxide particle comprising:
   (a) reacting an aluminum oxyhydroxide particle with a first reactive compound having an anchoring group and a first reactive group, whereby the anchoring group reacts with the particle, producing a first surface-modified particle; and
   (b) reacting said first surface-modified particle with a second reactive compound which is not an alumoxane and does not contain an N-alkylacrylamidoglycosyl group, said second reactive compound having a second reactive group, producing a second surface-modified particle, wherein the bond between the first surface-modified particle and the second reactive compound is organic.

2. A method of producing a surface-modified particle comprising:
   (a) reacting a particle having a particle size less than 5 mm and a surface shell comprising at least 5% aluminum oxyhydroxide, iron oxyhydroxide, a solid solution of aluminum oxyhydroxide and iron oxyhydroxide, clay or mixtures thereof with a first reactive compound having an anchoring group and a first reactive group, whereby the anchoring group reacts with the particle, producing a first surface-modified particle; and
   (b) reacting said first surface-modified particle with a second reactive compound, said second reactive compound having a second reactive group, producing a second surface-modified particle, wherein the reactions are not polymerization reactions and wherein the bond between the first surface-modified particle and the second reactive compound is organic.

3. A method of producing a surface-modified particle comprising:
   (a) reacting a particle having a particle size less than 5 mm and a surface shell comprising at least 5% aluminum oxyhydroxide, iron oxyhydroxide, a solid solution of aluminum oxyhydroxide and iron oxyhydroxide, or clay with a first reactive compound having an anchoring group and a first reactive group, whereby the anchoring group reacts with the particle, producing a first surface-modified particle; and
   (b) reacting said first surface-modified particle with a second reactive compound which is not an alumoxane and does not contain an N-alkylacrylamidoglycosyl group, said second reactive compound having a second reactive group, producing a second surface-modified particle, wherein the reactions are not polymerization reactions and wherein the bond between the first surface-modified particle and the second reactive compound is organic.

4. The method of claim 2, wherein step (b) is repeated one to ten times in reactions that are not polymerization reactions.

5. The method of claim 3, wherein step (b) is repeated one to ten times in reactions that are not polymerization reactions.

6. The method of claim 2, wherein the particle is a nanoparticle.

7. The method of claim 2, wherein the particle is selected from the group consisting of: aluminum oxyhydroxide, iron oxyhydroxide, a solid solution of aluminum oxyhydroxide and iron oxyhydroxide, and clay.

8. The method of claim 3, wherein the particle is selected from the group consisting of aluminum oxyhydroxide, iron oxyhydroxide, a solid solution of aluminum oxyhydroxide and iron oxyhydroxide, and clay.

9. The method of claim 2, wherein the particle is selected from the group consisting of aluminum oxyhydroxide, iron oxyhydroxide, and a solid solution of aluminum oxyhydroxide and iron oxyhydroxide.

10. The method of claim 3, wherein the particle is selected from the group consisting of aluminum oxyhydroxide, iron oxyhydroxide, and a solid solution of aluminum oxyhydroxide and iron oxyhydroxide.

11. The method of claim 2, wherein the particle is aluminum oxyhydroxide, iron oxyhydroxide, or a solid solution of aluminum oxyhydroxide and iron oxyhydroxide and the anchoring group is selected from the group consisting of: carboxylic group, sulfonic group and phosphonic acid group.

12. The method of claim 3 wherein the particle is aluminum oxyhydroxide, iron oxyhydroxide, or a solid solution of aluminum oxyhydroxide and iron oxyhydroxide and the anchoring group is selected from the group consisting of: carboxylic group, sulfonic group and phosphonic acid group.

13. The method of claim 2, wherein the particle is clay and the anchoring group is selected from the group consisting of: protonated amine, quaternary ammonium salt, protonated phosphine and phosphonium salt.

14. The method of claim 3, wherein the particle is clay and the anchoring group is selected from the group consisting of: protonated amine, quaternary ammonium salt, protonated phosphine and phosphonium salt.

15. The method of claim 2, wherein the particle has a core-shell structure, and the shell comprises at least 5% of a material selected from the group consisting of: aluminum oxyhydroxide, iron oxyhydroxide, a solid solution of aluminum oxyhydroxide and iron oxyhydroxide, and clay.

16. The method of claim 3, wherein the particle has a core-shell structure, and the shell comprises at least 5% of a material selected from the group consisting of: aluminum oxyhydroxide, iron oxyhydroxide, a solid solution of aluminum oxyhydroxide and iron oxyhydroxide, and clay.

17. The method of claim 2, wherein the particle has a core-shell structure and the core is aluminum oxide and the shell comprises at least 5% of aluminum oxyhydroxide.

18. The method of claim 3, wherein the particle has a core-shell structure and the core is aluminum oxide and the shell comprises at least 5% of aluminum oxyhydroxide.

19. The method of claim 2, wherein the particle is aluminum oxyhydroxide, iron oxyhydroxide, or a solid solution of aluminum oxyhydroxide and iron oxyhydroxide and the anchoring group is a carboxylic acid group.

20. The method of claim 3, wherein the particle is aluminum oxyhydroxide, iron oxyhydroxide, or a solid solution of aluminum oxyhydroxide and iron oxyhydroxide and the anchoring group is a carboxylic acid group.

21. The method of claim 2, wherein the particle is clay and the anchoring group is a quaternary ammonium salt.

22. The method of claim 3, wherein the particle is clay and the anchoring group is a quaternary ammonium salt.

23. The method of claim 2, wherein the anchoring group is selected from the group consisting of: a carboxylic acid group, a carboxylate salt, a phosphonic acid, a phosphonate salt, a sulfonic acid, an organic sulfate, a sulfonate salt, a boronic acid group, a boronate salt, an amino group, a quaternary ammonium salt, a phosphine group, a quaternary phosphonium salt, an hydroxyl group, a thiol, a disulfide, and a sulfonium salt.

24. The method of claim 23, wherein the anchoring group is selected from the group consisting of: carboxylic acid, sulfonic acid and phosphonic acid.

25. The method of claim 23, wherein the anchoring group is selected from the group consisting of: sulfonic and phosphonic groups.

26. The method of claim 23, wherein the anchoring group is selected from the group consisting of: ammonium ion, sulfonic and phosphonic groups.

27. The method of claim 2, wherein the particle is clay and the anchoring group is an ammonium ion.

28. The method of claim 2, wherein at least one of the reactive compounds is selected from the group consisting of: polyoxyalkyleneamines and alkylamines containing more than 7 carbon atoms, and aliphatic alcohols containing more than 7 carbon atoms.

29. The method of claim 3, wherein at least one of the reactive compounds is selected from the group consisting of: polyoxyalkyleneamines and alkylamines containing more than 7 carbon atoms, and aliphatic alcohols containing more than 7 carbon atoms.

30. The method of claim 2, wherein at least one of the reactive compounds is selected from the group consisting of: diamines and compounds containing activated carbon-carbon double bonds.

31. The method of claim 3, wherein at least one of the reactive compounds is selected from the group consisting of: diamines and compounds containing activated carbon-carbon double bonds.

32. The method of claim 2, wherein one of the first reactive group and the second reactive group contains a leaving group for nucleophilic substitutions on a suitable substrate for nucleophilic substitutions and the other of the first reactive group and the second reactive group is a nucleophile for nucleophilic substitutions.

33. The method of claim 2, wherein one of the first reactive group and the second reactive group contains a leaving group for electrophilic substitution reactions on a substrate for electrophilic substitutions and the other of the first reactive group and the second reactive group is an electrophile for electrophilic substitutions.

34. The method of claim 2, wherein at least one of the first reactive group and the second reactive group is a free-radical species or can generate a free radical species.

35. The method of claim 2, wherein one of the first reactive group and the second reactive group is either an alkene or an alkyne and the other of the first reactive group and the second reactive group is a diene.

36. The method of claim 2, further comprising:
(c) reacting said second surface-modified particle with a third reactive compound, producing a third surface-modified particle.

37. The method of claim 36, further comprising:
(d) reacting said third surface-modified particle with a fourth reactive compound, producing a fourth surface-modified particle.

38. The method of claim 37, further comprising:
(e) reacting said fourth surface-modified particle with a fifth reactive compound, producing a fifth surface-modified particle.

39. The method of claim 3, further comprising:
(c) reacting said second surface-modified particle with a third reactive compound, producing a third surface-modified particle.

40. The method of claim 39, further comprising:
(d) reacting said third surface-modified particle with a fourth reactive compound, producing a fourth surface-modified particle.

41. The method of claim 40, further comprising:
(e) reacting said fourth surface-modified particle with a fifth reactive compound, producing a fifth surface-modified particle.

42. The method of claim 2, wherein the first surface-modified particle is water-soluble.

43. The method of claim 42, wherein the second surface-modified particle is organic soluble.

44. The method of claim 2 wherein after step (b) unreacted first reactive groups remain on the second surface-modified particle and wherein the method further comprises a step of reacting the remaining first reactive groups with a third reactive compound, said third reactive compound having a third reactive group, which third reactive compound is different from said second reactive compound, producing a third surface-modified particle which is modified with two different surface groups.

45. The method of claim 44 wherein the third reactive compound further comprises a fourth reactive group and wherein the method further comprises a step of reacting the third surface-modified particle with a fifth reactive compound, said fifth reactive compound comprising a fifth reactive group, producing a fourth surface-modified particle which is modified with two different surface groups.

46. The method of claim 44 wherein the second reactive compound is a compound having molecular weight greater than 400 amu and containing a reactive organic functional group and the third reactive compound is a compound of molecular weight less than 400 amu containing two organic functional groups.

47. The method of claim 2 wherein the second surface-modified particles resulting from step (b) are not cross-linked with other particles.

48. Surface-modified particles made by the method of claim 2.

49. Surface-modified particles made by the method of claim 3.

* * * * *